(12) United States Patent
Kurasawa et al.

(10) Patent No.: US 9,753,581 B2
(45) Date of Patent: Sep. 5, 2017

(54) SENSOR-EQUIPPED DISPLAY DEVICE AND SENSOR DEVICE

(71) Applicant: Japan Display Inc., Tokyo (JP)

(72) Inventors: Hayato Kurasawa, Tokyo (JP); Hiroshi Mizuhashi, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 196 days.

(21) Appl. No.: 14/665,471

(22) Filed: Mar. 23, 2015

(65) Prior Publication Data

US 2015/0268797 A1 Sep. 24, 2015

(30) Foreign Application Priority Data

Mar. 24, 2014 (JP) .................................. 2014-059647
Dec. 5, 2014 (JP) ................................. 2014-247060

(51) Int. Cl.
 *G06F 3/041* (2006.01)
 *G06F 3/044* (2006.01)

(52) U.S. Cl.
 CPC ............ *G06F 3/0418* (2013.01); *G06F 3/044* (2013.01); *G06F 3/0412* (2013.01)

(58) Field of Classification Search
 None
 See application file for complete search history.

(56) References Cited

U.S. PATENT DOCUMENTS

| 8,553,013 | B2 | 10/2013 | Kim | |
|---|---|---|---|---|
| 9,146,412 | B2 | 9/2015 | Abe et al. | |
| 2008/0252608 | A1* | 10/2008 | Geaghan | G06F 3/044 345/173 |
| 2010/0328268 | A1* | 12/2010 | Teranishi | G06F 3/044 345/175 |

(Continued)

FOREIGN PATENT DOCUMENTS

| JP | 2005-044247 A | 2/2005 |
|---|---|---|
| JP | 2012-208749 | 10/2012 |

(Continued)

OTHER PUBLICATIONS

Korean Office Action (with English translation) issued on Jun. 15, 2016 in corresponding Korean Application No. 10-2015-0038408 (11 pages).

(Continued)

*Primary Examiner* — Kenneth Bukowski
(74) *Attorney, Agent, or Firm* — K&L Gates LLP

(57) ABSTRACT

According to one embodiment, a sensor-equipped display device includes a display panel including a sensor driving electrode, a detection electrode opposed to the sensor driving electrode, and a lead line electrically connected to the detection electrode, and a driving unit configured to supply a sensor driving signal to the sensor driving electrode, and to read out from the detection electrode a detection signal based on the sensor driving signal supplied to the sensor driving electrode. The detection electrode includes a large-width portion connected to the lead line and has a first width, (Continued)

and a main body portion which is continuous with the large-width portion, extends in a direction away from the lead line, and has a second width that is less than the first width.

5 Claims, 15 Drawing Sheets

(56) References Cited

U.S. PATENT DOCUMENTS

| | | | |
|---|---|---|---|
| 2012/0139829 A1 | 6/2012 | Anno et al. | |
| 2013/0222297 A1* | 8/2013 | Adachi | G06F 3/041 345/173 |
| 2013/0278516 A1* | 10/2013 | Nagata | G06F 3/041 345/173 |
| 2013/0293491 A1* | 11/2013 | Doi | G06F 3/044 345/173 |
| 2013/0307793 A1* | 11/2013 | Song | G06F 3/044 345/173 |
| 2013/0328807 A1* | 12/2013 | Matsumoto | G06F 3/0416 345/173 |
| 2013/0329347 A1* | 12/2013 | Kuo | H03K 17/962 361/679.01 |
| 2014/0063370 A1 | 3/2014 | Ko et al. | |

FOREIGN PATENT DOCUMENTS

| | | |
|---|---|---|
| KR | 10-2012-0014808 A | 2/2012 |
| KR | 10-2013-0122907 A | 11/2013 |
| TW | 201202812 A | 1/2012 |
| TW | 201319889 A | 5/2013 |

OTHER PUBLICATIONS

Taiwanese Office Action (with English translation) issued Jul. 19, 2016 in corresponding Taiwanese application No. 104107807 (7 pages).

* cited by examiner

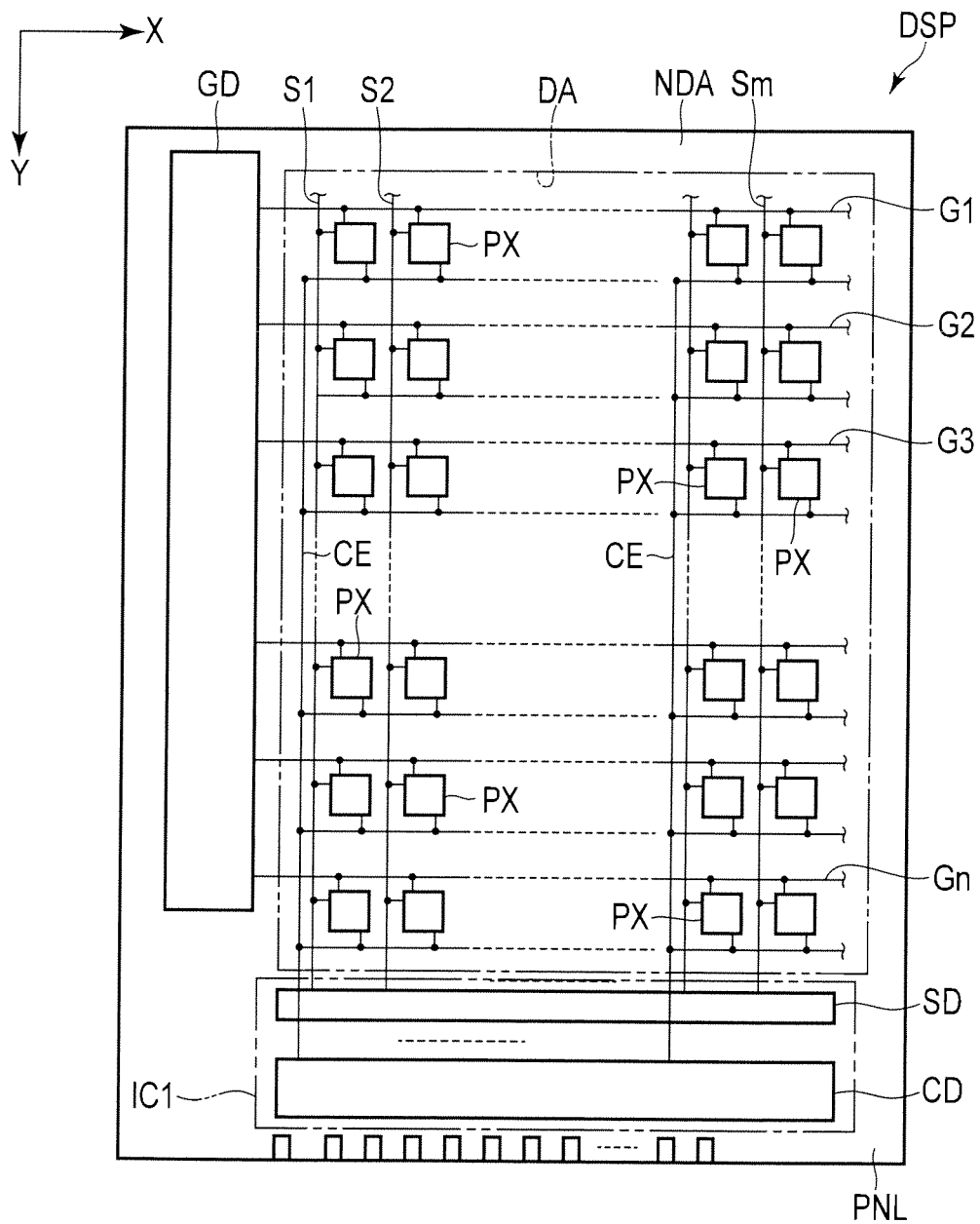
F I G. 2

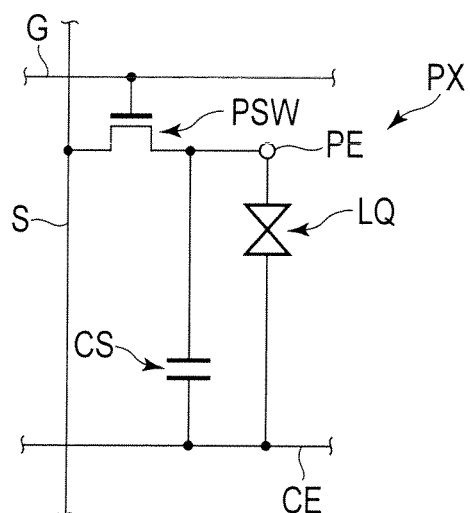
F I G. 3

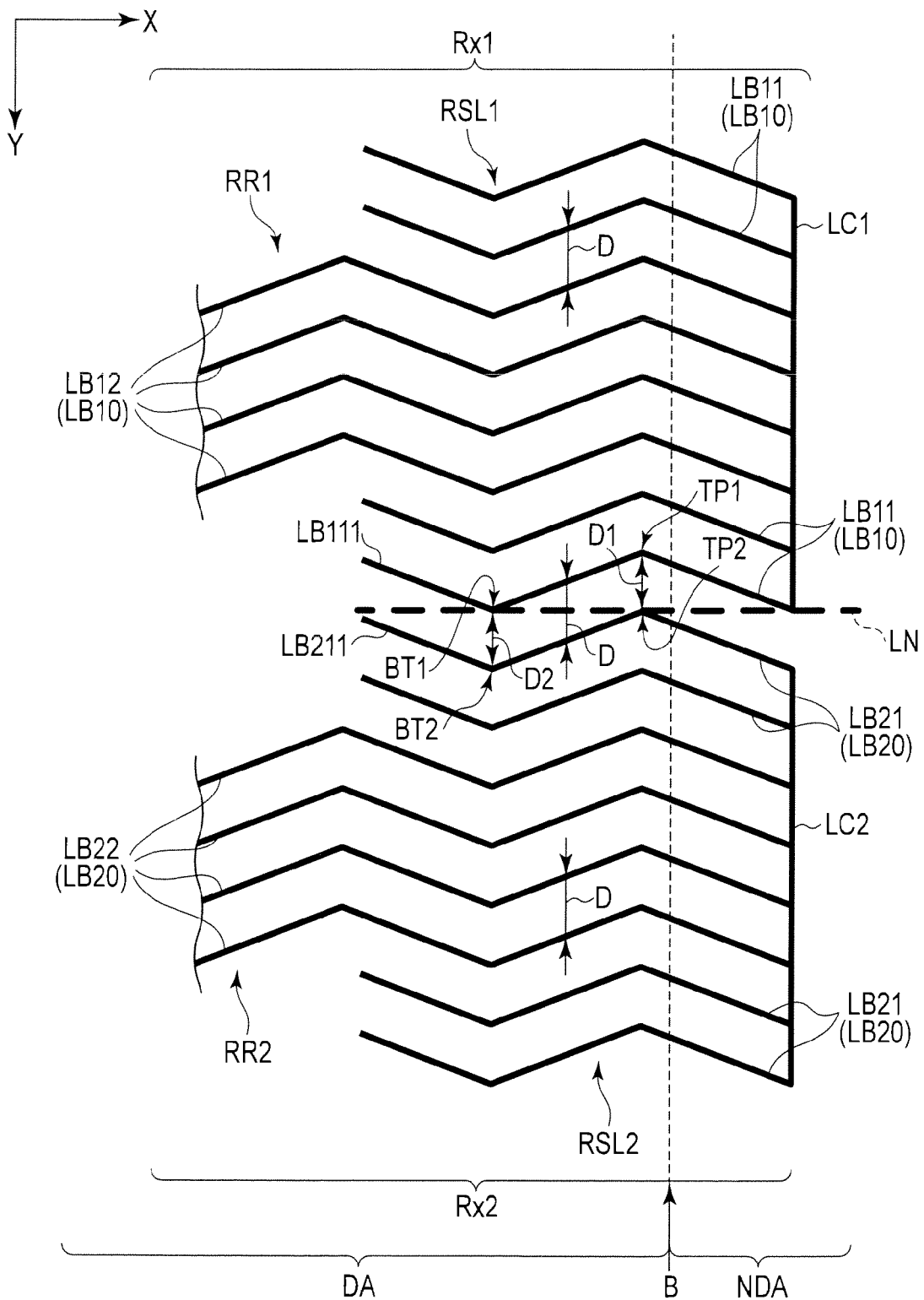
F I G. 6B

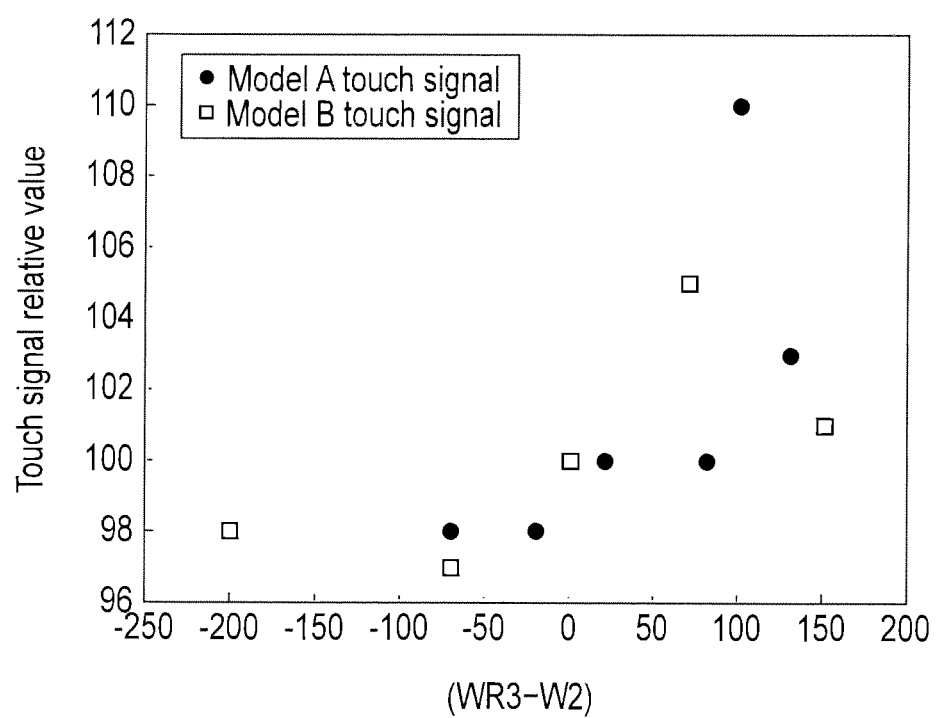
F I G. 11

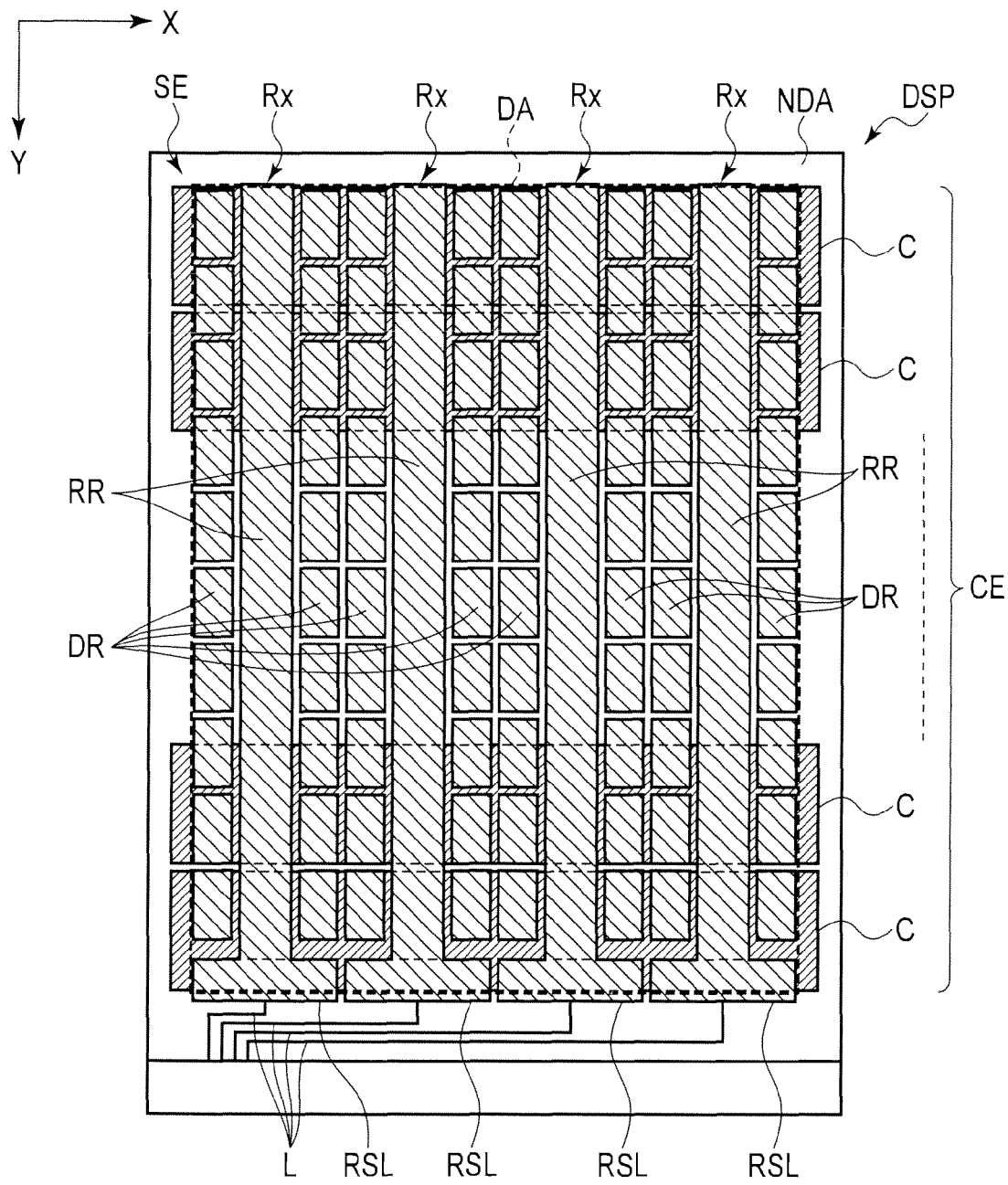
F I G. 14

SENSOR-EQUIPPED DISPLAY DEVICE AND SENSOR DEVICE

CROSS REFERENCES TO RELATED APPLICATIONS

The present application claims priority to Japanese Priority Patent Application JP 2014-059647 filed in the Japan Patent Office on Mar. 24, 2014, and JP 2014-247060 filed in the Japan Patent Office on Dec. 5, 2014, the entire content of which is hereby incorporated by reference.

BACKGROUND

Embodiments described herein relate generally to a sensor-equipped display device and a sensor device.

SUMMARY

In recent years, a sensor-equipped display device including a sensor (also called "touch panel" in some cases), which detects a contact or an approach of an object, has been put to practical use. As an example of the sensor, there is known an electrostatic capacitance-type sensor which detects a contact or an approach of an object, based on a variation in electrostatic capacitance. A detection electrode and a sensor driving electrode, which constitute such a sensor, are disposed in a display area which displays an image, and are opposed to each other via a dielectric. The detection electrode is electrically connected to a lead line which is located outside the display area.

While the display area is being made larger, there is an increasing demand for reduction in size of the display device. There is a tendency that a peripheral area outside the display area becomes narrower in picture frame size. Thus, there is a case in which the sensor driving electrode and the lead line are disposed close to each other. In this case, the lead line may function like a sensor due to capacitive coupling between the sensor driving electrode and the lead line. For example, when a to-be-detected object has come in contact with, or has approached, an outermost part of the display area, a variation in electrostatic capacitance at the lead line would be detected. Consequently, a malfunction would occur as if a detection electrode, which is connected to this lead line, detected the to-be-detected object at a position different from the position of a detection electrode which should normally detect the to-be-detected object.

This being the case, there has been proposed a technique of shutting off capacitive coupling between a sensor driving electrode and an outer peripheral wiring (lead line) by providing a grounded conductor material at a position outside the display area between the sensor driving electrode and the outer peripheral wiring.

Additional features and advantages are described herein, and will be apparent from the following Detailed Description and the figures.

BRIEF DESCRIPTION OF THE FIGURES

FIG. 2 is a view illustrating a basic structure and an equivalent circuit of a liquid crystal display device DSP shown in FIG. 1.

FIG. 3 is an equivalent circuit diagram illustrating a pixel PX shown in FIG. 2.

FIG. 6B is a schematic plan view illustrating, in enlarged scale, a large-width portion RSL of each of two detection electrodes Rx shown in FIG. 6A.

FIG. 11 is a graph illustrating an experiment result of experiments in which a touch signal relative to a difference between a third width WR3 and second electrode width W2 was measured with respect to the model A and model B which are examples of the present embodiment.

FIG. 14 is a plan view which schematically illustrates another structure of the sensor SE in the embodiment.

DETAILED DESCRIPTION

Figure 1:
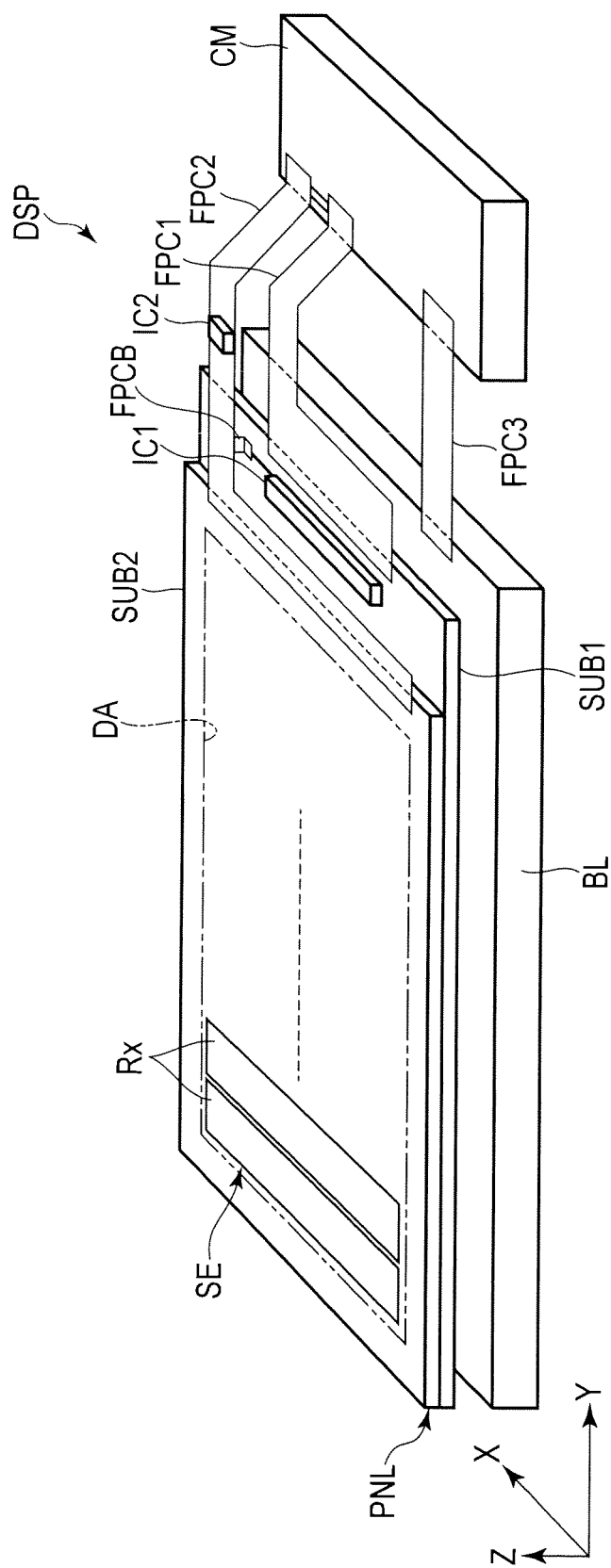
FIG. 1 is a perspective view which schematically illustrates the structure of a sensor-equipped display device according to an embodiment.

In general, according to one embodiment, a sensor-equipped display device includes: a display panel including a sensor driving electrode disposed in a display area which displays an image, a detection electrode opposed to the sensor driving electrode in the display area, and a lead line disposed in a non-display area outside the display area and electrically connected to the detection electrode; and a driving unit configured to supply a sensor driving signal to the sensor driving electrode, and to read out from the detection electrode a detection signal based on the sensor driving signal supplied to the sensor driving electrode, wherein the detection electrode includes a large-width portion which is connected to the lead line, disposed along a boundary between the display area and the non-display area and has a first width, and a main body portion which is continuous with the large-width portion, extends in a direction away from the lead line, is disposed in the display area, and has a second width that is less than the first width.

According to another embodiment, a sensor-equipped display device includes: a display panel including a common electrode and a pixel electrode which are disposed in a display area which displays an image, a detection electrode opposed to the common electrode in the display area, and a lead line disposed in a non-display area outside the display area and electrically connected to the detection electrode, wherein the detection electrode is formed of a connection line disposed in the non-display area and connected to the lead line, and a plurality of detection lines connected to the connection line, a number of the detection lines in a large-width portion extending over a boundary between the display area and the non-display area being greater than a number of the detection lines in a main body portion located in the display area.

According to another embodiment, a sensor device includes: a sensor panel including a sensor driving electrode disposed in a first area, a detection electrode opposed to the sensor driving electrode in the first area, and a lead line disposed in a second area outside the first area and electrically connected to the detection electrode; and a driving unit configured to supply a sensor driving signal to the sensor driving electrode, and to read out from the detection electrode a detection signal based on the sensor driving signal supplied to the sensor driving electrode, wherein the detection electrode includes a large-width portion which is connected to the lead line, disposed along a boundary between the first area and the second area and has a first width, and a main body portion which is continuous with the large-width portion, extends in a direction away from the lead line, is disposed in the first area, and has a second width that is less than the first width.

According to another embodiment, a sensor-equipped display device includes: a display panel including a common electrode and a pixel electrode which are disposed in a display area which displays an image, and a first detection electrode and a second detection electrode which are opposed to the common electrode in the display area, wherein the first detection electrode is formed of a first connection line disposed in a non-display area outside the display area, and a plurality of first detection lines connected to the first connection line, a number of the first detection lines in a first large-width portion extending over a boundary between the display area and the non-display area being greater than a number of the first detection lines in a first main body portion located in the display area, the second detection electrode is formed of a second connection line disposed in the non-display area, and a plurality of second detection lines connected to the second connection line, a number of the second detection lines in a second large-width portion extending over the boundary and neighboring the first large-width portion being greater than a number of the second detection lines in a second main body portion located in the display area, and the first detection lines and the second detection lines are arranged at regular intervals along the boundary.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a perspective view which schematically illustrates the structure of a sensor-equipped display device according to an embodiment. In the embodiment, the case in which the display device is a liquid crystal display device is described. However, the display device may be any kind of flat-panel display device, for instance, a self-luminous display device such as an organic electroluminescent display device, or an electronic paper-type display device including electrophoresis elements.

A liquid crystal display device DSP includes an active-matrix-type liquid crystal display panel PNL, a driving IC chip IC1 which drives the liquid crystal display panel PNL, a sensor SE of an electrostatic capacitance type, a driving IC chip IC2 which drives the sensor SE, a backlight unit BL which illuminates the liquid crystal display panel PNL, a control module CM, and flexible printed circuit boards FPC1, FPC2, FPC3.

The liquid crystal display panel PNL includes a first substrate SUB1 having a flat plate shape, a second substrate SUB2 having a flat plate shape, which is disposed to be opposed to the first substrate SUB1, and a liquid crystal layer (a liquid crystal layer LQ to be described later) which is held between the first substrate SUB1 and second substrate SUB2. Incidentally, in this embodiment, the first substrate SUB1 can be restated as an array substrate, and the second substrate SUB2 can be restated as a counter-substrate. The liquid crystal display panel PNL includes a display area (active area) DA which displays an image. This liquid crystal display panel PNL is a transmissive type with a transmissive display function of displaying an image by selectively transmitting light from the backlight unit BL. Incidentally, the liquid crystal display panel PNL may be a reflective type having, aside from the transmissive display function, a reflective display function of displaying an image by selectively reflecting light from the front surface side, such as ambient light or fill light. In addition, the liquid crystal display panel PNL may be a transflective type having both the transmissive display function and the reflective display function.

The backlight unit BL is disposed on a back surface side of the first substrate SUB1. As this backlight unit BL, various modes are applicable. In addition, as the light source, either a light-emitting diode (LED) or a cold cathode fluorescent lamp (CCFL) is applicable. A description of the detailed structure of the backlight unit BL is omitted. Incidentally, in the case where the liquid crystal display panel PNL is a reflective type having only the reflective display function, the backlight unit BL is omitted.

The sensor SE includes a plurality of detection electrodes Rx. These detection electrodes Rx are provided, for example, on the display surface of the liquid crystal display panel PNL. In this example, the detection electrodes Rx are schematically illustrated. In the example illustrated, the detection electrodes Rx extend substantially in a first direction X, and are arranged in a second direction Y. Incidentally, the respective detection electrodes Rx may extend in the second direction Y and may be arranged in the first direction X, or may be formed in island shapes and may be arranged in a matrix in the first direction X and second direction Y. In this example, the first direction X and second direction Y are perpendicular to each other. In the meantime, the first direction X and second direction Y may cross at an angle other than 90□. A third direction Z is perpendicular to each of the first direction X and second direction Y.

The driving IC chip IC1 is mounted on the first substrate SUB1 of the liquid crystal display panel PNL. The flexible printed circuit board FPC1 connects the liquid crystal display panel PNL and the control module CM. The flexible printed circuit board FPC2 connects the detection electrodes Rx of the sensor SE and the control module CM. The driving IC chip IC2 is mounted on the flexible printed circuit board FPC2. The flexible printed circuit board FPC3 connects the backlight unit BL and the control module CM. In this case, the control module CM can be restated as an application processor.

The driving IC chip IC1 and driving IC chip IC2 are connected via the flexible printed circuit board FPC2, etc. For example, in the case where the flexible printed circuit board FPC2 includes a branch portion FPCB which is connected onto the first substrate SUB1, the driving IC chip IC1 and driving IC chip IC2 may be connected via a wiring line included in the branch portion FPCB and a wiring line on the first substrate SUB1. In addition, the driving IC chip IC1 and driving IC chip IC2 may be connected via wiring lines included in the flexible printed circuit board FPC1 and flexible printed circuit board FPC2. One of the driving IC chip IC1 and driving IC chip IC2 can generate a timing signal, which indicates the timing of driving of the sensor SE, and can deliver this timing signal to the other driving IC chip. One of the driving IC chip IC1 and driving IC chip IC2 can generate a timing signal, which indicates the timing of driving of a common electrode CE (to be described later), and can deliver this timing signal to the other driving IC chip. Alternatively, the control module CM can deliver timing signals to the driving IC chips IC1 and IC2. By the timing signals, the driving of the driving IC chip IC1 and the driving of the driving IC chip IC2 can be synchronized.

FIG. 2 is a view illustrating a basic structure and an equivalent circuit of the liquid crystal display device DSP shown in FIG. 1.

The liquid crystal display device DSP includes, in addition to the liquid crystal display panel PNL, etc., a source line driving circuit SD, a gate line driving circuit GD and a common electrode driving circuit CD in a non-display area NDA on the outside of the display area DA. In an example, at least parts of the source line driving circuit SD and common electrode driving circuit CD are incorporated in the driving IC chip IC1. Incidentally, the non-display area NDA is formed in a picture frame shape surrounding the display area DA.

The liquid crystal display panel PNL includes a plurality of pixels PX in the display area DA. The plural pixels PX are disposed in a matrix in the first direction X and second direction Y, and the number of plural pixels PX is m×n (m and n are positive integer numbers). The plural pixels PX arranged in the first direction X constitute a pixel row, and the plural pixels PX arranged in the second direction Y constitute a pixel column. In addition, the liquid crystal display panel PNL includes, in the display area DA, an n-number of gate lines G (G1 to Gn), an m-number of source lines S (S1 to Sm) and a common electrode CE.

The gate lines G extend substantially linearly in the first direction X, are led out to the outside of the display area DA, and are connected to the gate line driving circuit GD. In addition, the gate lines G are arranged at intervals in the second direction Y. The source lines S extend substantially linearly in the second direction Y, are led out to the outside of the display area DA, and are connected to the source line driving circuit SD. In addition, the source lines S are arranged at intervals in the first direction X, and cross the gate lines G. In the meantime, the gate lines G and source lines S may not necessarily extend linearly, and portions thereof may be bent. The common electrode CE is led out to the outside of the display area DA, and is connected to the common electrode driving circuit CD. This common electrode CE is shared by the plural pixels PX. The details of the common electrode CE will be described later.

FIG. 3 is an equivalent circuit diagram illustrating the pixel PX shown in FIG. 2.

Each pixel PX includes a pixel switching element PSW, a pixel electrode PE, a common electrode CE, and a liquid crystal layer LQ. The pixel switching element PSW is formed of, for example, a thin-film transistor. The pixel switching element PSW is electrically connected to the gate line G and source line S. The pixel switching element PSW may be either a top-gate type or a bottom-gate type. In addition, although a semiconductor layer of the pixel switching element PSW is formed of, for example, polysilicon, the semiconductor layer may be formed of amorphous silicon or an oxide semiconductor. The pixel electrode PE is electrically connected to the pixel switching element PSW. The pixel electrode PE is opposed to the common electrode CE. The common electrode CE, an insulation film and pixel electrode PE form a storage capacitance CS.

Figure 4:
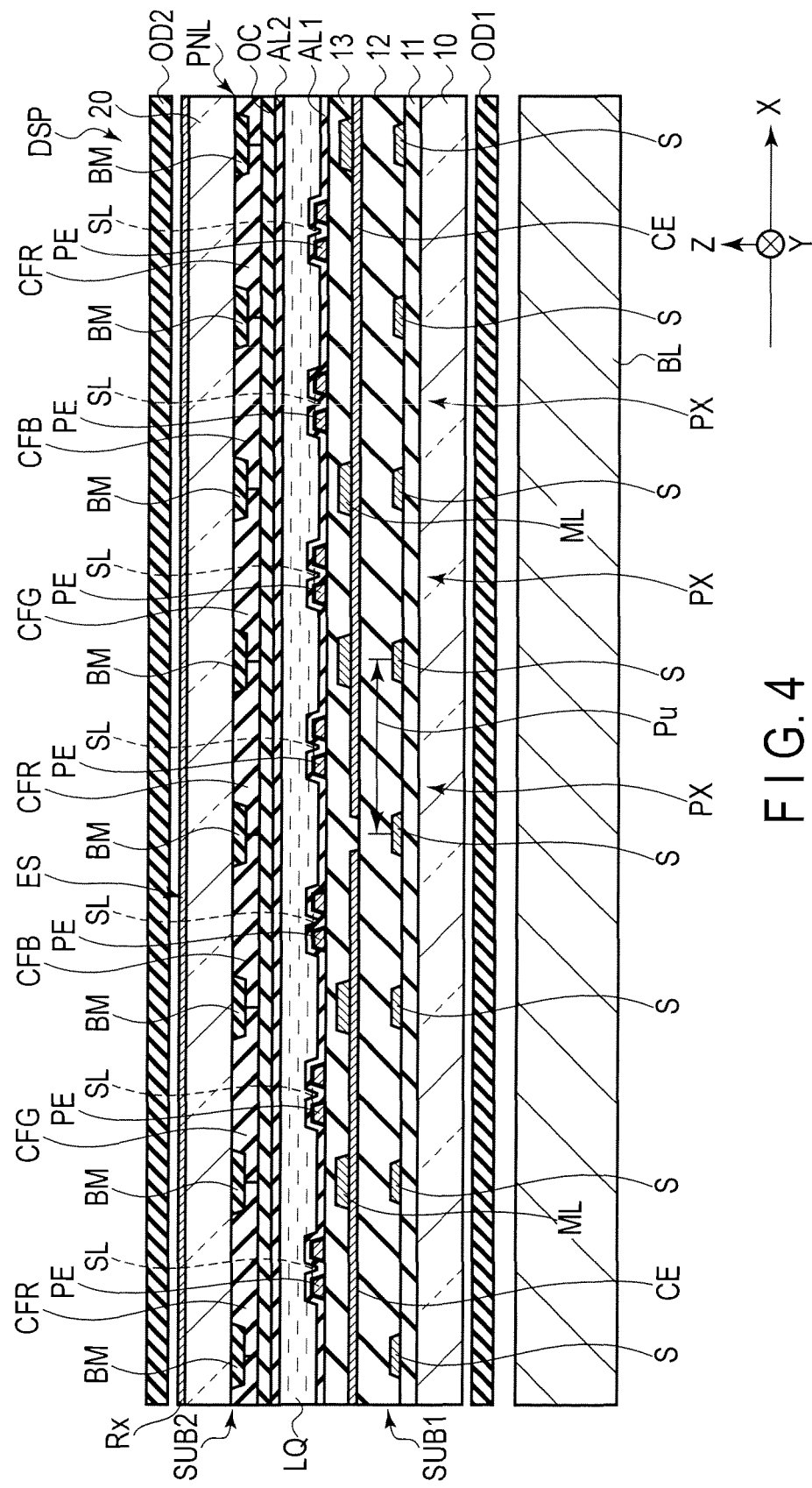
FIG. 4 is a cross-sectional view which schematically illustrates the structure of a part of the liquid crystal display device DSP.

FIG. 4 is a cross-sectional view which schematically illustrates the structure of a part of the liquid crystal display device DSP.

Specifically, the liquid crystal display device DSP includes a first optical element OD1 and a second optical element OD2, in addition to the above-described liquid crystal display panel PNL and backlight unit BL. Although the illustrated liquid crystal display panel PNL has a structure that is adaptive to an FFS (Fringe Field Switching) mode as a display mode, it may have a structure adaptive to some other display mode. For example, the liquid crystal display panel PNL may have a structure that is adaptive to an IPS (In-Plane Switching) mode, such as an FFS mode, which mainly utilizes a lateral electric field that is substantially parallel to the substrate major surface. In the display mode utilizing the lateral electric field, for example, a structure, in which both the pixel electrode PE and common electrode CE are provided on the first substrate SUB1, is applicable. Alternatively, the liquid crystal display panel PNL may have a structure that is adaptive to a display mode which mainly utilizes a vertical electric field that is generated in a direction crossing the substrate major surface, such as a TN (Twisted Nematic) mode, an OCB (Optically Compensated Bend) mode or a VA (Vertical Aligned) mode. In the display mode utilizing the vertical electric field, for example, a structure, in which the pixel electrode PE is provided on the first substrate SUB1 and the common electrode CE is provided on the second substrate SUB2, is applicable. Incidentally, the substrate major surface, in this context, refers to a surface which is parallel to an X-Y plane defined by the first direction X and second direction Y which are perpendicular to each other.

The liquid crystal display panel PNL includes the first substrate SUB1, second substrate SUB2 and liquid crystal layer LQ. The first substrate SUB1 and second substrate SUB2 are attached in a state in which a predetermined gap is created therebetween. The liquid crystal layer LQ is sealed in the gap between the first substrate SUB1 and second substrate SUB2.

The first substrate SUB1 is formed by using a first insulative substrate 10 with light transmissivity, such as a glass substrate or a resin substrate. The first substrate SUB1 includes gate lines, pixel switching elements, source lines S, a common electrode CE, pixel electrodes PE, a first insulation film 11, a second insulation film 12, a third insulation film 13, and a first alignment film AL1, on that side of the first insulative substrate 10, which is opposed to the second substrate SUB2.

The first insulation film 11 is disposed on the first insulative substrate 10. Although not described in detail, in the present embodiment, pixel switching elements of, for example, a top gate structure are applied. In this embodiment, the first insulation film 11 includes a plurality of insulation layers which are stacked in the third direction Z. For example, the first insulation film 11 includes various insulation layers, such as an undercoat layer lying between the first insulative substrate 10 and the semiconductor layer of the pixel switching element; a gate insulation layer lying between the semiconductor layer and the gate electrode; and an interlayer insulation layer lying between the gate electrode and a plurality of electrodes including a source electrode and a drain electrode. Like the gate electrode, the gate line is disposed between the gate insulation layer and the interlayer insulation layer. The source lines S are formed on the first insulation film 11. In addition, the source electrodes and drain electrodes of the pixel switching elements are formed on the first insulation film 11. In the example illustrated, the source lines S extend in the second direction Y.

The second insulation film 12 is disposed on the source lines S and first insulation film 11. The common electrode CE has a strip shape and is formed on the second insulation film 12. The common electrode CE is formed of a transparent, electrically conductive material such as indium tin oxide (ITO) or indium zinc oxide (IZO). Incidentally, in the example illustrated, although metal layers ML are formed on the common electrode CE and the resistance of the common electrode CE is decreased, the metal layers ML may be omitted.

The third insulation film 13 is disposed on the common electrode CE and second insulation film 12. The pixel electrodes PE are formed on the third insulation film 13. Each pixel electrode PE is located between neighboring source lines S, and is opposed to the common electrode CE. In addition, each pixel electrode PE includes a slit SL at a position opposed to the common electrode CE. Such pixel electrodes PE are formed of, for example, a transparent, electrically conductive material such as ITO or IZO. The first alignment film AL1 covers the pixel electrodes PE and third insulation film 13.

In this manner, the common electrode CE is provided in a layer different from the layer of the gate lines G, source lines S or pixel electrodes PE. Thus, the common electrode CE can be disposed in such a positional relationship as to cross the gate lines G, source lines S or pixel electrodes PE in the X-Y plane. Specifically, the common electrode CE can be provided to extend over neighboring pixels PX. In this embodiment, the common electrode CE has a strip shape with such a width that the common electrode CE can be opposed to a plurality of pixel columns, and extends in the second direction.

On the other hand, the second substrate SUB2 is formed by using a second insulative substrate 20 with light transmissivity, such as a glass substrate or a resin substrate. The second substrate SUB2 includes a black matrix BM, color filters CFR, CFG, CFB, an overcoat layer OC, and a second alignment film AL2, on that side of the second insulative substrate 20, which is opposed to the first substrate SUB1.

The black matrix BM is formed on an inner surface of the second insulative substrate 20 and partitions the respective pixels. The color filters CFR, CFG, CFB are formed on an inner surface of the second insulative substrate 20, and parts thereof overlap the black matrix BM. The color filter CFR is a red color filter which is disposed in a red pixel and is formed of a red resin material. The color filter CFG is a green color filter which is disposed in a green pixel and is formed of a green resin material. The color filter CFB is a blue color filter which is disposed in a blue pixel and is formed of a blue resin material. The example illustrated corresponds to the case in which a unit pixel, which is a minimum unit constituting a color image, is composed of three color pixels, namely a red pixel, a green pixel and a blue pixel. However, the unit pixel is not limited to the combination of the three color pixels. For example, the unit pixel may be composed of four color pixels, with a white pixel being added to the red pixel, green pixel and blue pixel. In this case, a white or transparent color filter may be disposed in the white pixel, or the color filter itself of the white pixel may be omitted. The overcoat layer OC covers the color filters CFR, CFG, CFB. The overcoat layer OC is formed of a transparent resin material. The second alignment film AL2 covers the overcoat layer OC.

Detection electrodes Rx are formed on an outer surface ES side of the second insulative substrate 20. In the example illustrated, the detection electrode Rx is in contact with the outer surface ES of the second insulative substrate 20, but the detection electrode Rx may be spaced apart from the outer surface ES. In the structure in which the detection electrode Rx is spaced apart from the outer surface ES, an insulation member lies between the outer surface ES and the detection electrode Rx. The detailed structure of the detection electrode Rx will be described later. The detection electrode Rx is illustrated in a simplified manner, and depiction of lead lines L (to be described later) is omitted. Such detection electrodes Rx are formed of, for example, a metallic material such as aluminum (to be described later). By decreasing the electrical resistance value of the detection electrode Rx, the time that is needed for detection can be shortened. Thus, to form the detection electrode Rx of a metal is advantageous in increasing the size and fineness of the liquid crystal display panel PNL. Incidentally, the detection electrode Rx may be formed of a transparent, electrically conductive material such as ITO or IZO, or may be formed of a combination (aggregation) of a metallic material (e.g. thin metal wire) and a transparent, electrically conductive material (e.g. strip-shaped conductive layer). Each detection electrode Rx is opposed to the common electrode CE via dielectrics such as the third insulation film 13, first alignment film AL1, liquid crystal layer LQ, second alignment film AL2, overcoat layer OC, color filters CFR, CFG and CFB, and second insulative substrate 20.

The first optical element OD1 is disposed between the first insulative substrate 10 and backlight unit BL. The second optical element OD2 is disposed above the detection electrodes Rx. Each of the first optical element OD1 and second optical element OD2 includes at least a polarizer, and may also include a retardation plate, where necessary. The polarizer included in the first optical element OD1 and the polarizer included in the second optical element OD2 are disposed, for example, in a positional relationship of crossed Nicols in which their absorption axes are perpendicular to each other.

Next, the sensor SE of the electrostatic capacitance type, which is mounted in the liquid crystal display device DSP of this embodiment, is described.

Figure 5:
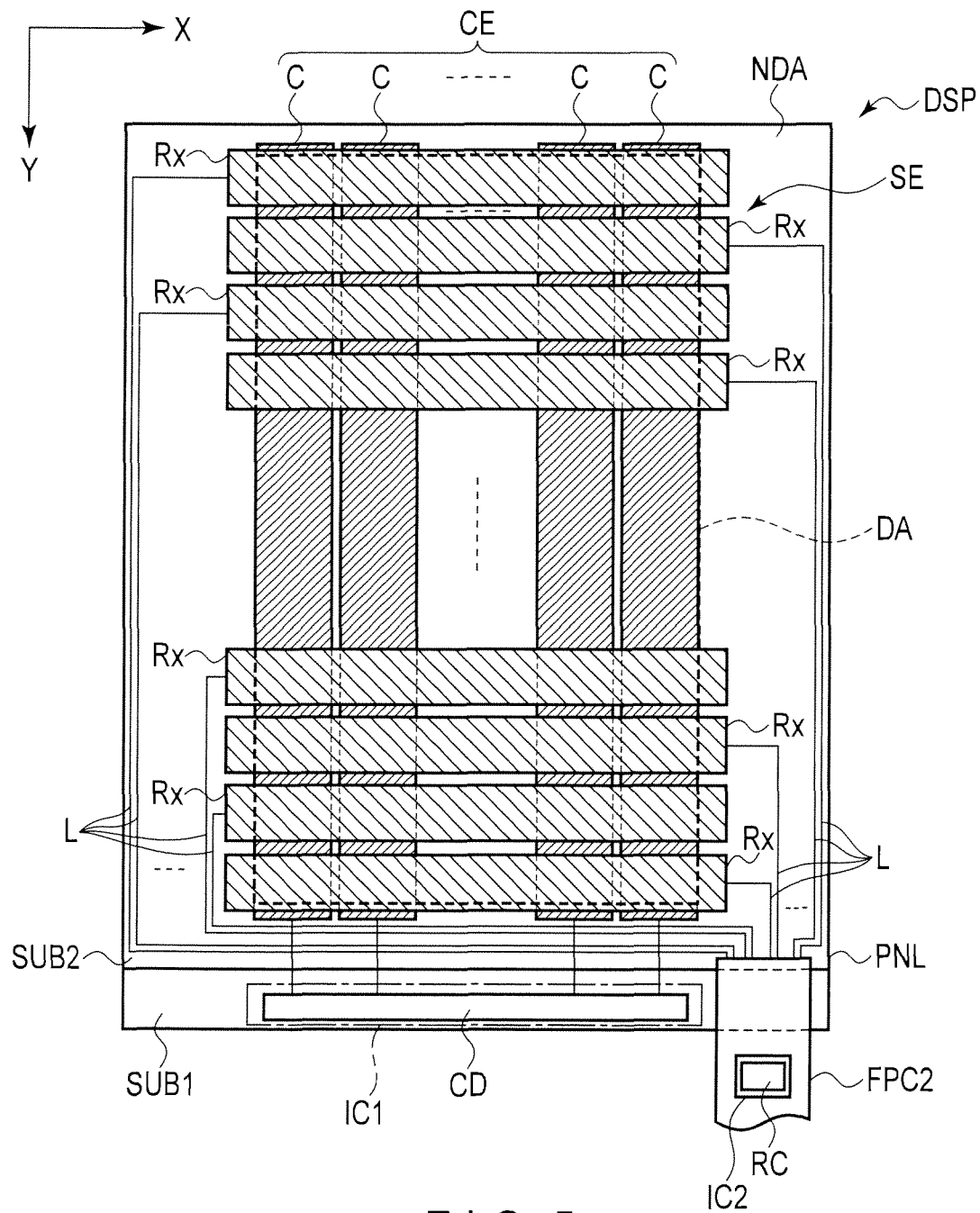
FIG. 5 is a plan view which schematically illustrates the structure of a sensor SE in the embodiment.

FIG. 5 is a plan view which schematically illustrates the structure of the sensor SE in the embodiment. In this embodiment, the sensor SE includes a common electrode CE of the first substrate SUB1, and detection electrodes Rx of the second substrate SUB2. Specifically, the common electrode CE functions as an electrode for display by generating an electric field between the common electrode CE and the pixel electrodes PE, and also functions as a sensor driving electrode by generating a capacitance between the common electrode CE and the detection electrodes Rx.

The liquid crystal display panel PNL includes lead lines L, in addition to the above-described common electrode CE and detection electrodes Rx. The common electrode CE and detection electrodes Rx are disposed in the display area DA. In the example illustrated, the common electrode CE includes, in the display area DA, a plurality of strip-shaped divisional electrodes C which are arranged at intervals in the first direction X, and extend substantially linearly in the second direction Y. On the other hand, in the display area DA, the detection electrodes Rx are arranged at intervals in the second direction Y, and extend substantially linearly in the first direction X. Specifically, in this example, the detection electrodes Rx extend in a direction crossing the divisional electrodes C. As described above, the common electrode CE and detection electrodes Rx are opposed to each other via various dielectrics. In the X-Y plane, one divisional electrode C is opposed to a plurality of pixel columns and a plurality of source lines S shown in FIG. 2, and crosses a plurality of gate lines G. On the other hand, one detection electrode Rx is opposed to a plurality of pixel rows and a plurality of gate lines G shown in FIG. 2, and crosses a plurality of source lines S.

Incidentally, the number of divisional electrodes C and the size and shape of the divisional electrode C are not specifically restricted, and may be variously changed. In addition, as in an example to be described later, the common electrodes CE may be arranged at intervals in the second direction Y, and may extend substantially linearly in the first direction X. Furthermore, the common electrode CE may not be divided, and may be a single flat-plate electrode which is continuously formed in the display area DA.

The lead lines L are disposed in the non-display area on the second substrate SUB2, and are electrically connected to the detection electrodes Rx in a one-to-one correspondence. Each of the lead lines L outputs a sensor output value from the detection electrode Rx. In the example illustrated, the lead lines L are arranged on both sides of the non-display area NDA, with the display area DA being interposed. For example, lead lines L connected to odd-numbered detection electrodes Rx of the detection electrodes Rx arranged in the second direction Y are disposed on a non-display area NDA on the left side in the Figure, and lead lines L connected to even-numbered detection electrodes Rx of the detection electrodes Rx are disposed on a non-display area NDA on the right side in the Figure. This layout of lead lines L is adaptive to uniformization in width of both sides of the non-display area NDA and to reduction in picture frame size. Such lead lines L, like the detection electrodes Rx, are disposed, for example, on the second substrate SUB2.

In the meantime, as regards the lead lines L, such a configuration may be adopted that lead lines L corresponding to a plurality of detection electrodes Rx, which are an upper half of the plural detection electrodes Rx arranged in the second direction Y on the display area, are disposed on one end portion of the non-display area NDA, and lead lines L corresponding to a plurality of detection electrodes Rx, which are a lower half of the plural detection electrodes Rx, are disposed on the other end portion of the non-display area NDA.

The liquid crystal display device DSP includes a common electrode driving circuit CD which is disposed on the non-display area NDA. Each of the divisional electrodes C is electrically connected to the common electrode driving circuit CD. In an example, at least a part of the common electrode driving circuit CD is incorporated in the driving IC chip IC1, but the configuration of the common electrode driving circuit CD is not limited to this example. For example, the common electrode driving circuit CD may be provided outside the driving IC chip IC1. The common electrode driving circuit CD functions as a driving unit which supplies a common driving signal to the common electrode CE at a display driving time for displaying an image, and supplies a sensor driving signal to the common electrode CE at a sensing driving time for executing sensing.

The flexible printed circuit board FPC2 is connected to the second substrate SUB2, and is electrically connected to each of the lead lines L. A detection circuit RC is incorporated in, for example, the driving IC chip IC2. This detection circuit RC functions as a driving unit which causes the detection electrode Rx to detect a sensor driving signal from the common electrode CE as a detection signal, and which reads out a variation of the detection signal as a sensor output value. The detection circuit RC with this function detects a contact of a to-be-detected object with the liquid crystal display device DSP, or an approach of the to-be-detected object to the liquid crystal display device DSP, based on the sensor output value from the detection electrode Rx. Furthermore, the detection circuit RC can detect position information of a position where the to-be-detected object comes in contact with, or approaches, the liquid crystal display device DSP. Incidentally, the detection circuit RC may be included in the control module CM.

Figure 6A:
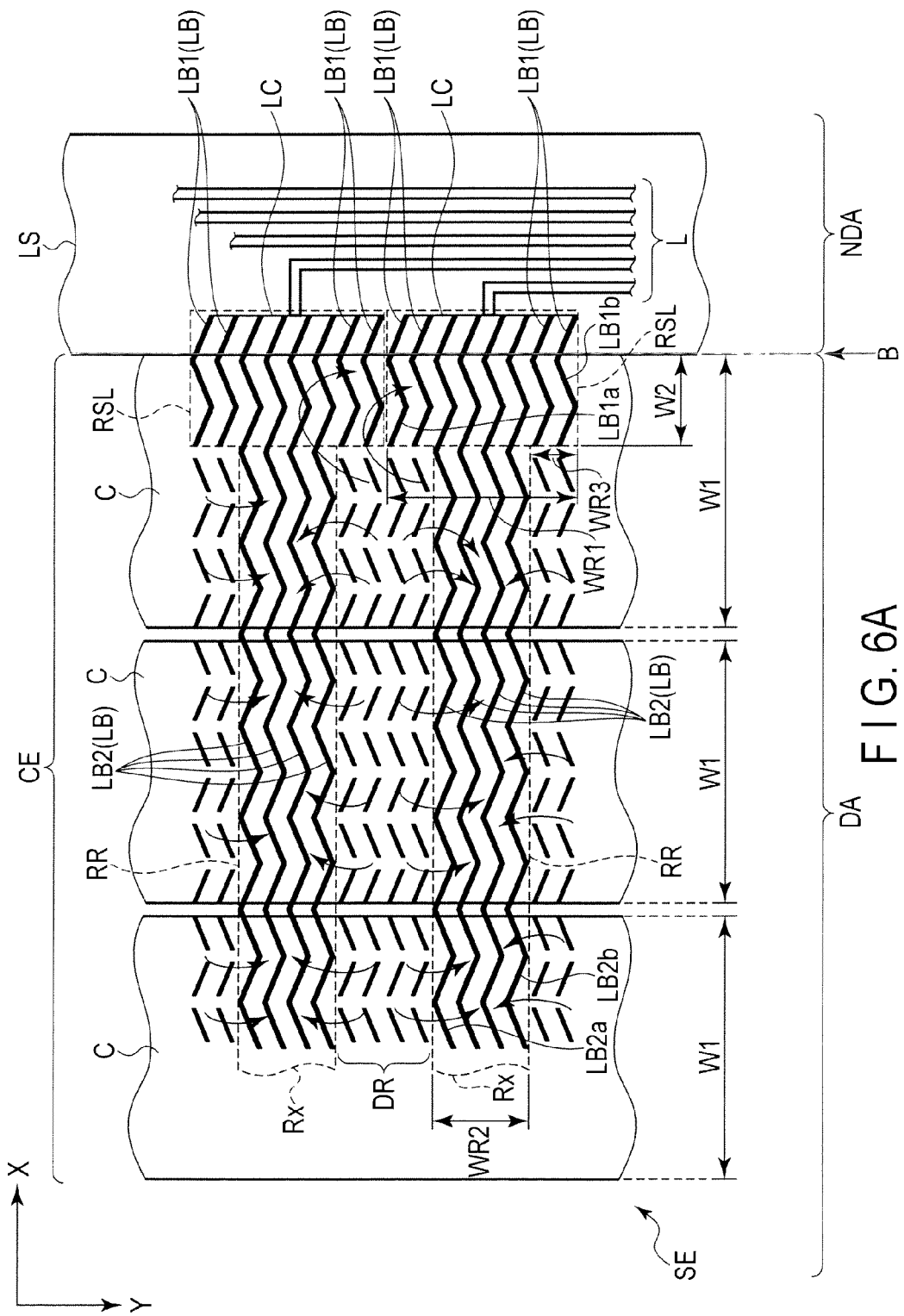
FIG. 6A is a plan view which schematically illustrates, in enlarged scale, a part of the sensor SE shown in FIG. 5.

FIG. 6A is a plan view which schematically illustrates, in enlarged scale, a part of the sensor SE shown in FIG. 5.

A peripheral light-shield layer LS is disposed in the non-display area NDA. This peripheral light-shield layer LS extends over almost the entirety of the non-display area NDA. In the display area DA, the respective divisional electrodes C of the common electrode CE are arranged in the first direction X. Each divisional electrode C has a first electrode width W1 in the first direction X. In this case, a boundary B between the display area DA and non-display area NDA corresponds to a position of an edge on the display area side of the peripheral light-shield layer LS. An end portion of the display area DA is that area portion of the display area, which is close to the boundary B. In the meantime, in the illustrated example, an end side of that divisional electrode C of the common electrode C, which is closest to the non-display area NDA, is disposed at a position overlapping the boundary B. However, this end side may be positioned either in the display area DA or in the non-display area NDA.

The lead lines L are disposed in the non-display area NDA. Specifically, the lead lines L are disposed at positions overlapping the peripheral light-shield layer LS. In the non-display area NDA, the respective lead lines L extend substantially in the second direction Y, and are arranged substantially at regular intervals in the first direction X.

The detection electrode Rx includes a large-width portion RSL and a main body portion RR. The large-width portion RSL is connected to the lead line L and is disposed along the boundary B between the display area DA and non-display area NDA. In the example illustrated, the large-width portion RSL is disposed to extend over the boundary B. Incidentally, at least a part of the large-width portion RSL is located, in the X-Y plane shown in FIG. 6A, between the end side of that divisional electrode C, which is closest to the non-display area NDA, and the lead line L. This large-width portion RSL has a first width WR1 in the second direction Y. The main body portion RR is continuous with the large-width portion RSL and is disposed in the display area DA. This main body portion RR has a second width WR2 in the second direction Y. The second width WR2 is less than the first width WR1. In the example illustrated, the large-width portion RSL neighbors the main body portion RR in the first direction X, and is formed over such an area as to project in both directions along the second direction Y relative to the main body portion RR. If attention is paid to a part of the detection electrode Rx illustrated, the detection electrode Rx is formed substantially in a T shape. Incidentally, the opposite side of the display area DA, which is not shown, has the same shape, and one detection electrode Rx is formed substantially in an I shape. That part of the large-width portion RSL, which projects from the main body portion RR in the second direction Y, has a third width WR3.

That part of the large-width portion RSL, which is located in the display area DA, has a second electrode width W2. The second electrode width W2 can be variously set within such a range as not to exceed the first electrode width W1. According to the result of the study by the inventor, which will be described later, it is desirable that the second electrode width W2 be equal to or less than half the electrode width W1. In addition, it is desirable that the second electrode width W2 be less than the third width WR3. However, it is desirable that each of the first electrode width W1 and second electrode width W2 be an integer number of times of a pixel pitch Pu in the first direction X of the pixels PX. The pixel pitch Pu, in this context, refers to a pitch in the first direction X of the centers of neighboring source lines S shown in FIG. 4.

In the present embodiment, the detection electrode Rx is formed of a connection line LC and a plurality of detection lines LB. The connection line LC is disposed in the large-width portion RSL which is located in the non-display area NDA. Incidentally, the connection line LC corresponding to the end portion of the detection electrode Rx may be disposed in the non-display area NDA, as in the example illustrated, or may be disposed at a position overlapping the boundary B. This connection line LC is connected to the lead lines L. In addition, the connection line LC extends in the second direction Y, and both ends thereof correspond to one end and the other end of the connection line LC. Each of the plural detection lines LB is disposed to extend from the non-display area NDA to the display area DA. The respective detection lines LB are connected to the connection line LC from one end side to the other end side thereof in the non-display area NDA, and extend substantially in the first direction X in the display area DA. In the example illustrated, each of the detection lines LB is formed in a wavy shape (to be more specific, a triangular wavy shape) along the first direction X. These detection lines LB are arranged substantially at regular intervals in the second direction Y along the boundary B. Incidentally, the detection lines LB of each of the detection electrodes Rx neighboring in the second direction Y are also arranged substantially at regular intervals in the second direction Y along the boundary B. Such detection lines LB include first detection lines LB1 which are disposed only in the large-width portion RSL, and second detection lines LB2 which are longer than the first detection lines LB1 and extend over the large-width portion RSL and main body portion RR. In the example illustrated, two first detection lines LB1 are connected to each of one end side and the other end side of the connection line LC, and four second detection lines LB2 are connected to a central part of the connection line LC.

In other words, the large-width portion RSL is formed of an aggregate of proximal end portions of the first detection lines LB1 and second detection lines LB2. In addition, the main body portion RR is formed of an aggregate of second detection lines LB2 extending from the large-width portion RSL. Specifically, the number of detection lines LB in the large-width portion RSL (the total number of first detection lines LB1 and second detection lines LB2; for instance, 8) is greater than the number of detection lines LB in the main body portion RR (the total number of second detection lines LB2; for instance, 4).

In this case, each of the first width WR1 of the large-width portion RSL and the second width WR2 of the main body portion RR corresponds to a distance in the second direction Y between detection lines LB which are connected to one end side and the other end side of the connection line LC, respectively. In the example illustrated, the first width WR1 is a first distance in the second direction Y between a first detection line LB1$a$ (an apex portion of an upwardly (in the Figure) convexed part of the first detection line LB1$a$), which is connected to one end side of the connection line LC, and a first detection line LB1$b$ (an apex portion of a downwardly (in the Figure) convexed part of the first detection line LB1$b$), which is connected to the other end side of the connection line LC. The second width WR2 is a second distance in the second direction Y between a second detection line LB2$a$ (an apex portion of an upwardly (in the Figure) convexed part of the second detection line LB2$a$), which is connected to one end side of the connection line LC, and a second detection line LB2$b$ (an apex portion of a downwardly (in the Figure) convexed part of the second detection line LB2$b$), which is connected to the other end side of the connection line LC. The first distance is greater than the second distance.

A dummy electrode DR is disposed between neighboring detection electrodes Rx. Dummy electrodes DR are disposed in parallel to the detection lines LB, and substantially at regular intervals. The dummy electrode DR is not connected to wiring lines such as lead lines L, and are set in an electrically floating state. In the example illustrated, the dummy electrode DR is disposed between neighboring main body portions RR, but is not disposed between neighboring large-width portions RSL.

The plural detection electrodes Rx are arranged in the second direction Y. The large-width portions RSL of detection electrodes Rx, which are disposed to neighbor each other, are electrically insulated from each other and are disposed to neighbor each other.

FIG. 6B is a schematic plan view illustrating, in enlarged scale, the large-width portion RSL of each of two detection electrodes Rx shown in FIG. 6A.

Specifically, a detection electrode Rx1 includes a main body portion RR1 and a large-width portion RSL1. A detection electrode Rx2 includes a main body portion RR2 and a large-width portion RSL2. The large-width portion RSL1 and large-width portion RSL2 are arranged in the second direction Y along the boundary B between the display area DA and non-display area NDA.

In the detection electrode Rx1, a plurality of detection lines LB10 are connected to one connection line LC1. The plural detection lines LB10 include first detection lines LB11 disposed in the large-width portion RSL1, and second detection lines LB12 disposed in the large-width portion RSL1 and main body portion RR1. These plural detection lines LB10 are arranged at regular intervals D along the second direction Y.

In the detection electrode Rx2, a plurality of detection lines LB20 are connected to one connection line LC2. The plural detection lines LB20 include first detection lines LB21 disposed in the large-width portion RSL2, and second detection lines LB22 disposed in the large-width portion RSL2 and main body portion RR2. These plural detection lines LB20 are arranged at regular intervals D along the second direction Y. In addition, a detection line LB111 in the detection electrode Rx1, which neighbors the detection electrode Rx2, and a detection line LB211 in the detection electrode Rx2, which neighbors the detection electrode Rx1, are arranged with an interval D in the second direction Y. Each of the detection lines LB10 and detection lines LB20 is formed in a triangular wavy shape in one example, as described above. In the description below, as regards this detection line, an apex portion of a convex part thereof, which is convexed in a positive direction (i.e. downward in the Figure) along the second direction Y, is referred to "bottom", and an apex portion of a convex part thereof, which is convexed in a negative direction (i.e. upward in the Figure) along the second direction Y, is referred to "top".

Attention is now paid to the neighboring detection line LB111 and detection line LB211. In one example, a bottom BT1 of the detection line LB111 and a top TP2 of the detection line LB211 are located on an identical straight line LN indicated by a broken line in the Figure. When the detection line LB111 includes a plurality of bottoms BT1, the top TP2 of the detection line LB211 is located on the straight line LN which connects the plural bottoms BT1. Alternatively, when the detection line LB211 includes a plurality of tops TP2, the bottom BT1 of the detection line LB111 is located on the straight line LN which connects the plural tops TP2. In other words, in the example illustrated, a distance D in the second direction Y between the detection line LB111 and detection line LB211 is equal to a distance D1 in the second direction Y between a top TP1 and bottom BT1 of the detection line LB111 (i.e. a wave height of the detection line LB111 of the triangular wavy shape), and to a distance D2 in the second direction Y between the top TP2 and a bottom BT2 of the detection line LB211 (i.e. a wave height of the detection line LB211 of the triangular wavy shape).

Specifically, not only the detection lines LB of the large-width portion RSL in each detection electrode Rx, but also the detection lines LB of mutually neighboring large-width portions RSL, are provided in a manner to mesh each other. Thus, the gap between the neighboring large-width portions RSL is filled with their mutual detection lines LB, and there occurs no leakage of an electric field from the gap between these large-width portions.

These large-width portions RSL form surrounding portions which are arranged on an identical straight line along the second direction Y. Specifically, in the neighboring detection electrodes Rx, while a gap, which is opposed to the common electrode CE, is formed between the main body portions RR of these detection electrodes Rx, this gap between the main body portions is surrounded by the large-width portions RSL, which are arranged on an identical straight line, at the boundary B between the display area DA and non-display area NDA and the peripheral area of the boundary B. The surrounding portion, which is formed by the large-width portions RSL, functions as a so-called barrier between the common electrode CE and lead lines L, which suppresses occurrence of a parasitic capacitance between the common electrode CE and lead lines L. Accordingly, an electrostatic capacitance is formed between the common electrode CE and the large-width portion RSL of the detection electrode Rx via the gap between the main body portions, and, as a result, it is possible to suppress formation of a capacitance between the common electrode CE and lead lines L via the gap (and hence, to suppress extraction of noise at a time of detecting a to-be-detected object). In addition, at the boundary B and the peripheral area thereof, an electrostatic capacitance is formed between the common electrode CE and large-width portion RSL, and the to-be-detected object in this area can exactly be detected.

Figure 6C:
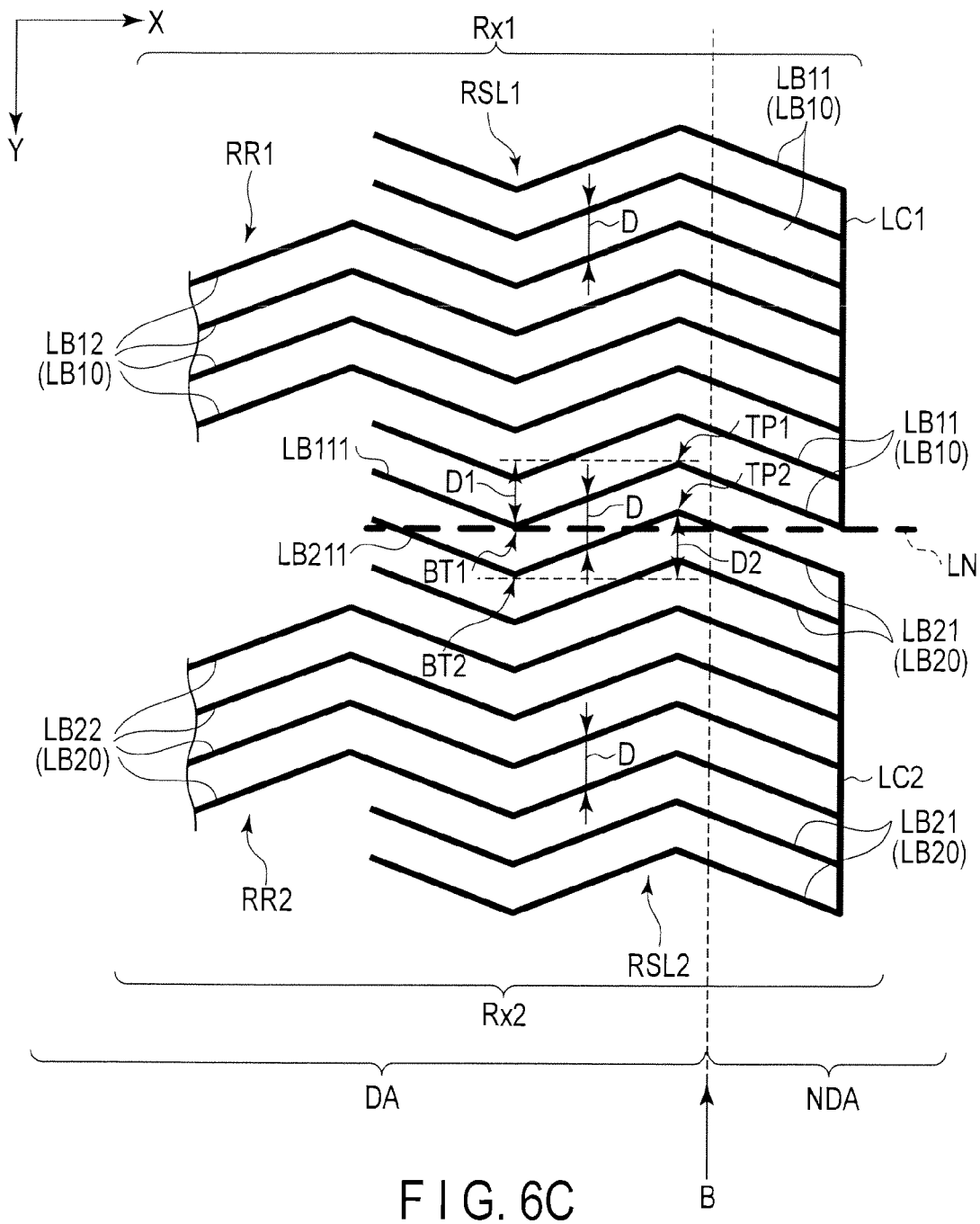
FIG. 6C is another schematic plan view illustrating, in enlarged scale, the large-width portion RSL of each of two detection electrodes Rx shown in FIG. 6A.

FIG. 6C is another schematic plan view illustrating, in enlarged scale, the large-width portion RSL of each of two detection electrodes Rx shown in FIG. 6A.

The example illustrated in FIG. 6C differs from the example illustrated in FIG. 6B in that the detection lines LB are arranged more densely at regular intervals D. Specifically, in the detection electrode Rx1, a plurality of detection lines LB10, which are connected to the connection line LC1, are arranged at regular intervals D in the second direction Y. In the detection electrode Rx2, a plurality of detection lines LB20, which are connected to the connection line LC2, are arranged at regular intervals D in the second direction Y. In addition, a detection line LB111 in the detection electrode Rx1, which neighbors the detection electrode Rx2, and a detection line LB211 in the detection electrode Rx2, which neighbors the detection electrode Rx1, are arranged with an interval D in the second direction Y.

In an example, a distance D in the second direction Y between the detection line LB111 and detection line LB211 is less than a distance D1 in the second direction Y between the top TP1 and bottom BT1 of the detection line LB111 (i.e. a wave height of the detection line LB111 of the triangular wavy shape), and a distance D2 in the second direction Y between the top TP2 and bottom BT2 of the detection line LB211 (i.e. a wave height of the detection line LB211 of the triangular wavy shape). In other words, the top TP2 of the detection line LB211 is located on the detection line LB111 side of a straight line LN which passes through the bottom BT1 of the detection line LB111 and is indicated by a broken line in the Figure. When the detection line LB111 includes a plurality of bottoms BT1, the top TP2 of the detection line LB211 is located on that side of the straight line LN connecting the plural bottoms BT1, which is closer to the top TP1 of the detection line LB111.

In this manner, even when the detection lines LB are disposed more densely, the same advantageous effects as described with reference to FIG. 6B can be obtained.

Figure 7:
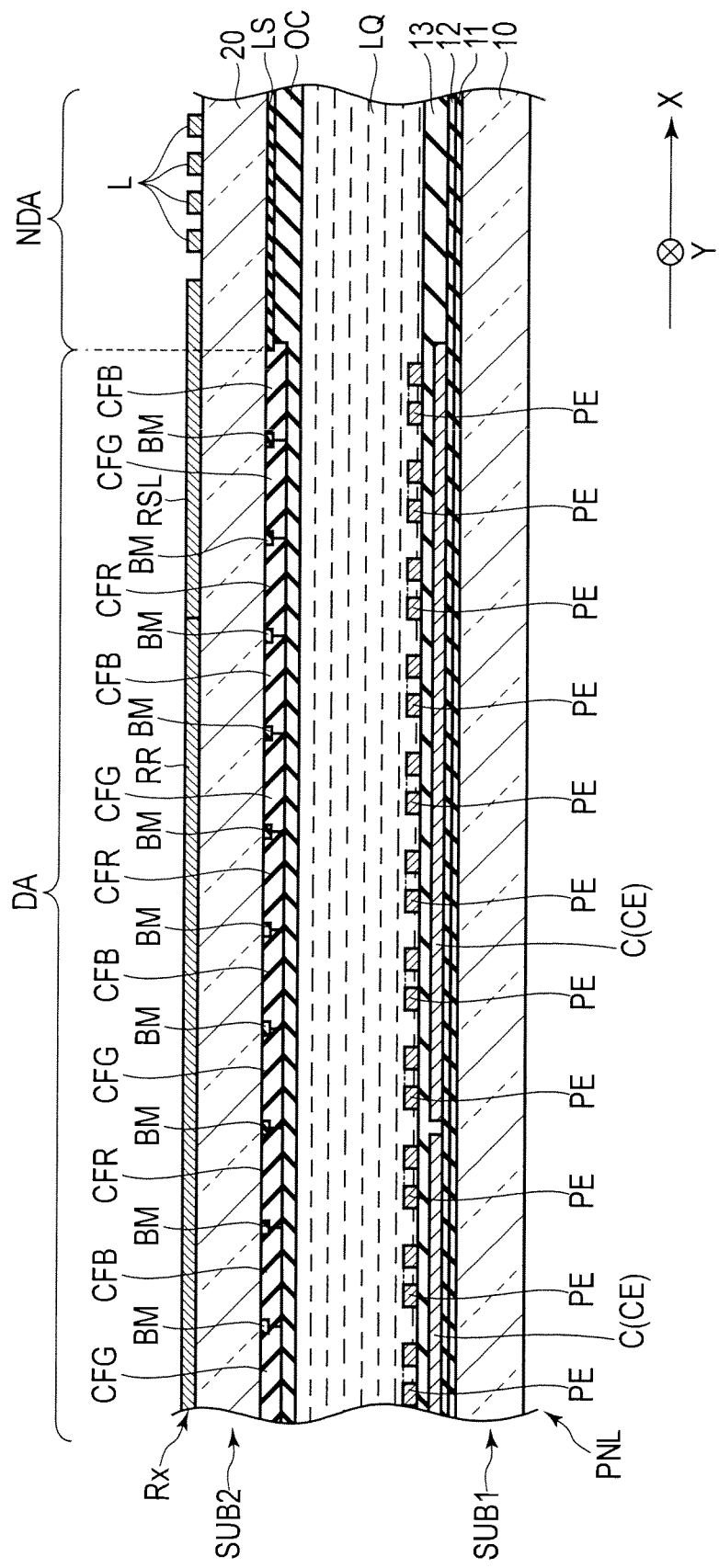
FIG. 7 is a cross-sectional view which schematically illustrates the structure of a liquid crystal display panel PNL including a part of the sensor SE shown in FIG. 6A.

FIG. 7 is a cross-sectional view which schematically illustrates the structure of a liquid crystal display panel PNL including a part of the sensor SE shown in FIG. 6A. FIG. 7 shows only a main part which is necessary for the description.

A common electrode CE and pixel electrodes PE are located on the inner surface side of the first substrate SUB1, which is opposed to the second substrate SUB2. Specifically, the common electrode CE is formed on a second insulation film 12 and is covered with a third insulation film 13. The pixel electrodes PE are formed on the third insulation film 13 and are opposed to the common electrode CE. Incidentally, the number of pixel electrodes PE, which are located immediately above the common electrode CE, is not limited to this example. Depiction of various wiring lines, such as source lines, and the first alignment film is omitted.

A black matrix BM, color filters CFR, CFG and CFB, an overcoat layer OC, and a peripheral light-shield layer LS are located on the inner surface side of the second substrate SUB2, which is opposed to the first substrate SUB1. Specifically, in the display area DA, the color filters CFR, CFG and CFB are formed at positions opposed to the respective pixel electrodes PE. The black matrix BM is located at boundaries between these color filters CFR, CFG and CFB. In the non-display area NDA, the peripheral light-shield layer LS is formed on the inner surface of the second insulative substrate 20. This peripheral light-shield layer LS is formed of the same material as the black matrix BM. The overcoat layer OC extends over the display area DA and non-display area NDA. Incidentally, depiction of the second alignment film is omitted.

Detection electrodes Rx and lead lines L are located on the outer surface side of the second substrate SUB2, which is opposite to the side thereof facing the first substrate SUB1. The detection electrodes Rx and lead lines L are formed of a metallic material, such as aluminum (Al), titanium (Ti), silver (Ag), molybdenum (Mo), tungsten (W), copper (Cu), or chromium (Cr). In the detection electrode Rx, not only the main body portion RR, but also the large-width portion RSL, which is located in the display area DA, is located above the common electrode CE and pixel electrodes PE. In the meantime, although the detection electrode Rx, which is located in the display area DA, is formed of the above-described opaque metallic material, the detection electrode Rx is formed of detection lines LB made of thin wires each having a width of, e.g. about 3 to 5 μm, and thus the transmittance of each pixel does not considerably deteriorate. In addition, since each detection line LB is formed of a thin wire extending in a direction different from the direction of arrangement of pixels (the first direction X and second direction Y), moire with the pixel layout is suppressed and degradation in display quality is suppressed. Incidentally, instead of being formed of plural detection lines LB made of the metallic material, the detection electrode Rx may be formed of a strip-shaped electrode made of a transparent, electrically conductive material such as ITO, as will be described above.

Next, a description is given of an operation at a display driving time for displaying an image in the above-described FFS-mode liquid crystal display device DSP.

To begin with, an OFF state, in which no fringe electric field is produced in the liquid crystal layer LQ, is described. The OFF state corresponds to a state in which no potential difference is produced between the pixel electrode PE and common electrode CE. In this OFF state, the liquid crystal molecules included in the liquid crystal layer LQ are initially aligned in one direction in the X-Y plane by an alignment restriction force of the first alignment film AL1 and second alignment film AL2. Part of light from the backlight unit BL passes through the polarizer of the first optical element OD1, and enters the liquid crystal display panel LPN. The light, which enters the liquid crystal display panel LPN, is linearly polarized light which is perpendicular to the absorption axis of the polarizer. The polarization state of such linearly polarized light hardly varies when the light passes through the liquid crystal display panel LPN in the OFF state. Thus, most of the linearly polarized light, which has passed through the liquid crystal display panel LPN, is absorbed by the polarizer of the second optical element OD2 (black display). Specifically, the light from the backlight unit BL does not contribute to display, and a black screen is displayed on the display area DA. A mode, in which black display is effected on the liquid crystal display panel PNL in the OFF state, is called "normally black mode".

Then, an ON state, in which a fringe electric field is produced in the liquid crystal layer LQ, is described. The ON state corresponds to a state in which a potential difference is produced between the pixel electrode PE and common electrode CE. Specifically, a common driving signal is supplied to the common electrode CE from the common electrode driving circuit CD. On the other hand, such a video signal as to produce a potential difference relative to a common potential is supplied to the pixel electrode PE. Thereby, in the ON state, a fringe electric field is produced between the pixel electrode PE and common electrode CE.

In this ON state, the liquid crystal molecules included are aligned in an azimuth direction in the X-Y plane, which is different from the initial alignment direction, by the effect of the fringe electric field produced in the liquid crystal layer. In the ON state, linearly polarized light, which is perpendicular to the absorption axis of the polarizer of the first optical element OD1, enters the liquid crystal display panel LPN, and the polarization state thereof varies depending on the alignment state of liquid crystal molecules when the light passes through the liquid crystal layer LQ. Thus, in the ON state, at least part of the light, which has passed through the liquid crystal layer LQ, passes through the polarizer of the second optical element OD2 (white display).

By this structure, the normally black mode is realized. In the display area DA, an area where the common electrode CE and pixel electrodes PE are opposed contributes to display.

Next, a description is given of an operation at a sensing driving time for executing sensing for detecting a contact or approach of a to-be-detected object in the above-described liquid crystal display device DSP.

Figure 8:
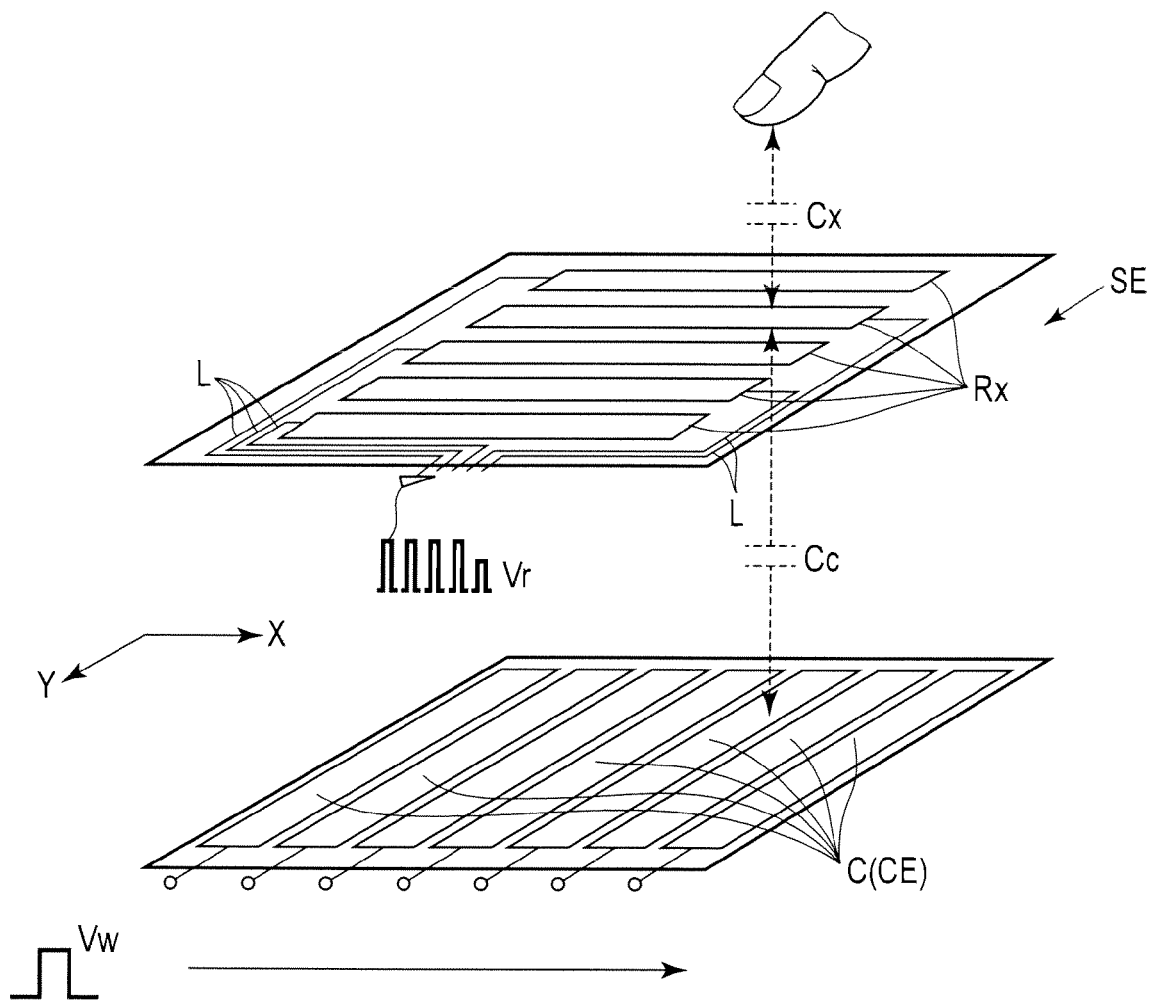
FIG. 8 is a view for explaining the principle of an example of a sensing method.

Specifically, a sensor driving signal is supplied to the common electrode CE from the common electrode driving circuit CD. In this state, sensing is executed. Referring now to FIG. 8, the principle of an example of the sensing method is explained.

A capacitance Cc is present between divisional electrodes C and detection electrodes Rx. A pulse-shaped write signal (sensor driving signal) Vw is successively supplied to each of the divisional electrodes C at predetermined cycles. In this example, it is assumed that the user's finger, which is a to-be-detected object, exists in close proximity to a position where a specific detection electrode Rx and a divisional electrode C intersect. A capacitance Cx is produced by the to-be-detected object that is in close proximity to the detection electrode Rx. When the pulse-shaped write signal Vw has been supplied to the divisional electrode C, a pulse-shaped read signal (sensor output value) Vr having a lower level than pulses, which are obtained from other detection electrodes, is obtained from the specific detection electrode Rx.

In the detection circuit RC shown in FIG. 5, two-dimensional position information of the to-be-detected object in the X-Y plane of the sensor SE can be detected, based on the timing of supply of the write signal Vw to the divisional electrode C and the read signal Vr from each detection electrode Rx. In addition, the capacitance Cx differs between a case in which the to-be-detected object is near the detection electrode Rx and a case in which the to-be-detected object is far from the detection electrode Rx. Accordingly, the level of the read signal Vr differs between a case in which the to-be-detected object is near the detection electrode Rx and a case in which the to-be-detected object is far from the detection electrode Rx. Thus, in the detection circuit RC, the degree of close proximity (the distance in the normal direction of the sensor SE) of the to-be-detected object to the sensor SE can also be detected based on the level of the read signal Vr.

The above-described display driving and sensing driving are performed, for example, in one frame period. In an example, one frame period is divided into a first period and a second period. In the first period, display driving is executed in which video signals are written to all pixels of the display area DA. In the second period following the first period, sensing driving is executed in which the to-be-detected object is detected over the entirety of the display area DA.

In another example, one frame period is further divided into a plurality of periods. In addition, the display area DA is divided into a plurality of blocks, and display driving and sensing driving are executed in units of a block. Specifically, in a first period of one frame period, first display driving is executed in which video signals are written in pixels of a first display block of the display area DA. In a second period following the first period, first sensing driving is executed in which the to-be-detected object is detected in a first sensing block of the display area DA. The first sensing block and the first display block may be the same area, or may be different areas. In a third period following the second period, second display driving is executed in which video signals are written in pixels of a second display block, which is different from the first display block. In a fourth period following the third period, second sensing driving is executed in which the to-be-detected object is detected in a second sensing block which is different from the first sensing block. In this manner, it is possible to alternately execute display driving and sensing driving in one frame period, and to detect the to-be-detected object over the entirety of the display area DA, while writing video signals to all pixels of the display area DA.

According to the present embodiment, in the detection electrodes Rx which are disposed to neighbor each other, while the gap, which is opposed to the common electrode CE, is formed between the mutually neighboring main body portions RR, the plural large-width portions RSL are arranged to neighbor each other at the boundary B between the display area DA and non-display area NDA and the peripheral area of the boundary B. Accordingly, an electrostatic capacitance is formed between the common electrode CE and the large-width portion RSL of the detection electrode Rx via the gap between the main body portions, and, as a result, it is possible to suppress (shield) formation of a capacitance between the common electrode CE and lead lines L via the gap (and hence, to suppress extraction of noise at a time of detecting the to-be-detected object). Thus, even in the structure in which the common electrode CE and lead lines L are disposed close to each other to meet a demand for reduction in picture frame size, it is possible to suppress formation of an undesired capacitance between the common electrode CE and lead lines L. Therefore, at the sensing driving time, it is possible to suppress a malfunction of the sensor SE due to capacitive coupling between the common electrode CE and lead lines L.

In addition, at the boundary B and the peripheral area thereof, the large-width portion RSL is opposed to the common electrode CE, and a capacitance is formed between the common electrode CE and the large-width portion RSL. Thus, at the sensing driving time, not only the main body portion RR but also the large-width portion RSL functions as the detection electrode. Accordingly, also at the boundary B and the peripheral area thereof, detection with high precision of the to-be-detected object becomes possible. Moreover, since the large-width portion RSL, together with the main body portion RR, is formed as the detection electrode Rx, a special fabrication step for forming the large-width portion RSL is needless.

Besides, since the detection lines LB of detection electrodes Rx and the lead lines L are disposed on the outer surface of the second insulative substrate 20, these can be formed in the same fabrication step by using the same material. In addition, since the detection lines LB and lead lines L can be formed of a metallic material which has a much lower electrical resistance value than a transparent, electrically conductive material, the line width can be reduced, and these lines can be wired over a long distance while the small line width is kept.

Since the line width of the detection line LB is small, the transmittance of each pixel in the display area DA is not considerably decreased. In addition, since each detection line LB extends in a direction different from the direction of arrangement of pixels (the first direction X and second direction Y), moire with the pixel layout is suppressed and degradation in display quality is suppressed. Furthermore, since the line width of the lead line L is small, it is possible to suppress formation of an undesired capacitance between the lead line L and the to-be-detected object which comes in contact with, or approaches, the non-display area NDA, and noise can be reduced.

In the present embodiment, it is desirable that the second electrode width W2 of the large-width portion RSL be equal to or less than half the first electrode width W1 of the divisional electrode C. In addition, it is desirable that the second electrode width W2 be less than the third width WR3. Specifically, the respective divisional electrodes C of the common electrode CE are disposed with an equal pitch, and have a uniform electrode width W1. As the second electrode width W2 of the large-width portion RSL is greater, the electric field shield effect between the common electrode CE and lead lines L becomes higher and the noise due to the capacitance between the common electrode CE and lead lines L can be more reduced, but the display area-side end portion of the large-width portion RSL becomes more distant from the boundary B between the display area DA and non-display area NDA, leading to a decrease in sensitivity of sensing near the end portion of the display area DA.

Figure 9:
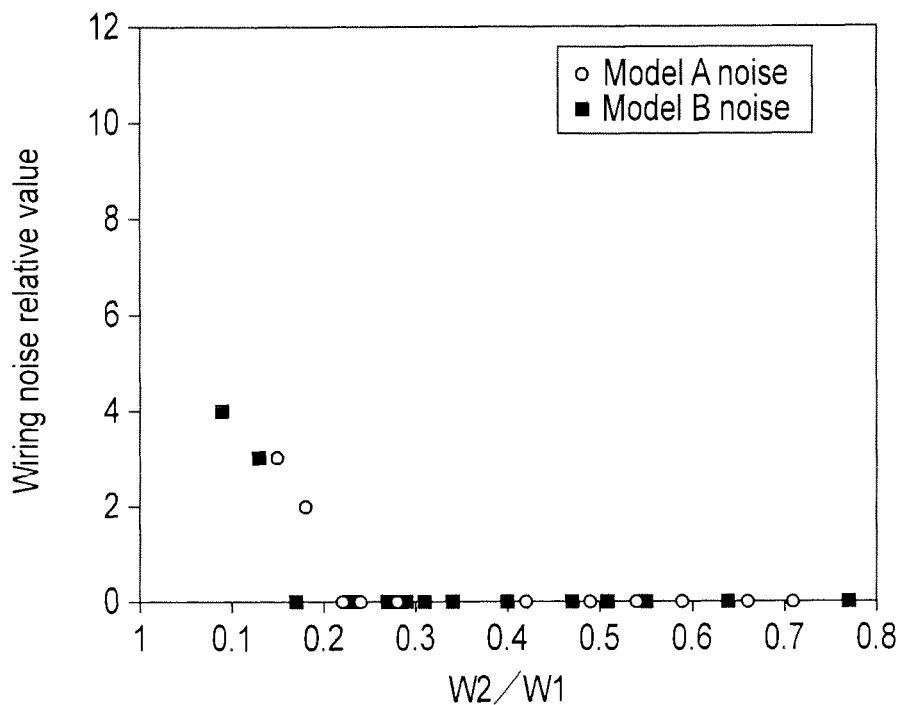
FIG. 9 is a graph illustrating an experiment result of experiments in which a wiring noise amount relative to a ratio between a first electrode width W1 and a second electrode width W2 was measured with respect to a model A and a model B which are examples of the present embodiment.
Figure 10:
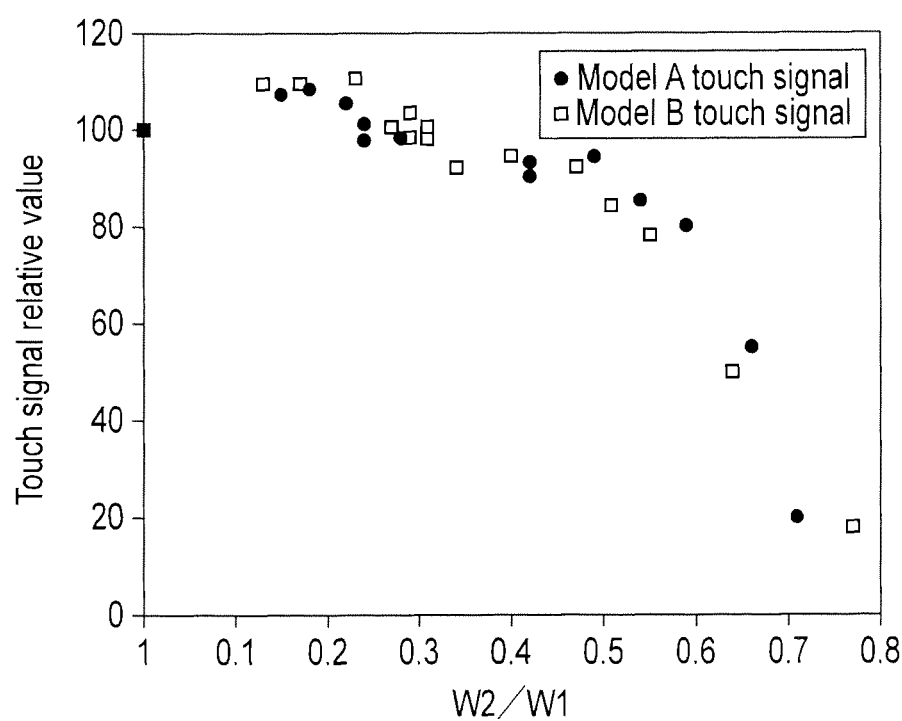
FIG. 10 is a graph illustrating an experiment result of experiments in which a touch signal relative to a ratio between the first electrode width W1 and second electrode width W2 was measured with respect to the model A and model B which are examples of the present embodiment.

The inventor conducted experiments in which the wiring noise amount of lead lines L and the touch signal at a time when the to-be-detected object comes in contact with the vicinity of the end portion of the display area DA were measured by setting the first electrode width W1 at a constant value and by variously changing the second electrode width W2. FIG. 9 is a graph showing a result of experiments in which the wiring noise amount relative to the ratio between the first electrode width W1 and second electrode width W2 was measured with respect to a model A and a model B which are examples of the embodiment. In FIG. 9, the ordinate indicates a relative value of wiring noise, and the abscissa indicates the value of W2/W1. FIG. 10 is a graph showing a result of experiments in which the touch signal relative to the ratio between the first electrode width W1 and second electrode width W2 was measured with respect to the model A and model B which are examples of the embodiment. In FIG. 10, the ordinate indicates a relative value of the touch signal, and the abscissa indicates the value of W2/W1.

At first, with respect to the model A in which the first electrode width W1 was set at 4250 µm, the wiring noise amount and touch signal were measured by varying the second electrode width W2 in the range of 0 µm to 3000 µm. According to the result of experiments, it was confirmed that when the value of W2/W1 is 0.5 or less, the wiring noise amount is substantially zero and degradation in touch signal can be suppressed. However, it was confirmed that when the value of W2/W1 is 0.2 or less, wiring noise occurs since the electric field shield effect between the common electrode CE and lead lines L lowers.

In addition, with respect to the model B in which the first electrode width W1 was set at 2350 µm, the wiring noise amount and touch signal were measured by varying the second electrode width W2 in the range of 0 µm to 1800 µm. According to the result of experiments, it was also confirmed that, like the model A, when the value of W2/W1 is 0.5 or less, the wiring noise amount is substantially zero and degradation in touch signal can be suppressed. However, it was confirmed that when the value of W2/W1 is 0.13 or less, wiring noise occurs.

According to the above-described results of experiments, from the standpoint of wiring noise and sensitivity of sensing, it is desirable that the second electrode width W2 be 0.5 or less times as large as the first electrode width W1, and be 0.2 or more times as large as the first electrode width W1.

Next, the inventor conducted experiments in which the touch signal at a time when the to-be-detected object comes in contact with the vicinity of the end portion of the display area DA was measured by variously changing the third width WR3 and the second electrode width W2, with respect to both the above-described model A and model B. FIG. 11 shows a result of experiments. In FIG. 11, the ordinate indicates a relative value of the touch signal, and the abscissa indicates the value of (WR3−W2).

According to the above result of experiments, it was confirmed that degradation of the touch signal can be suppressed when (WR3−W2) is a positive value. Therefore, it is desirable that the second electrode with W2 be less than the third width WR3.

Next, a modification of the electrostatic capacitance-type sensor SE, which is mounted in the liquid crystal display device DSP of the present embodiment, is described.

Figure 12:
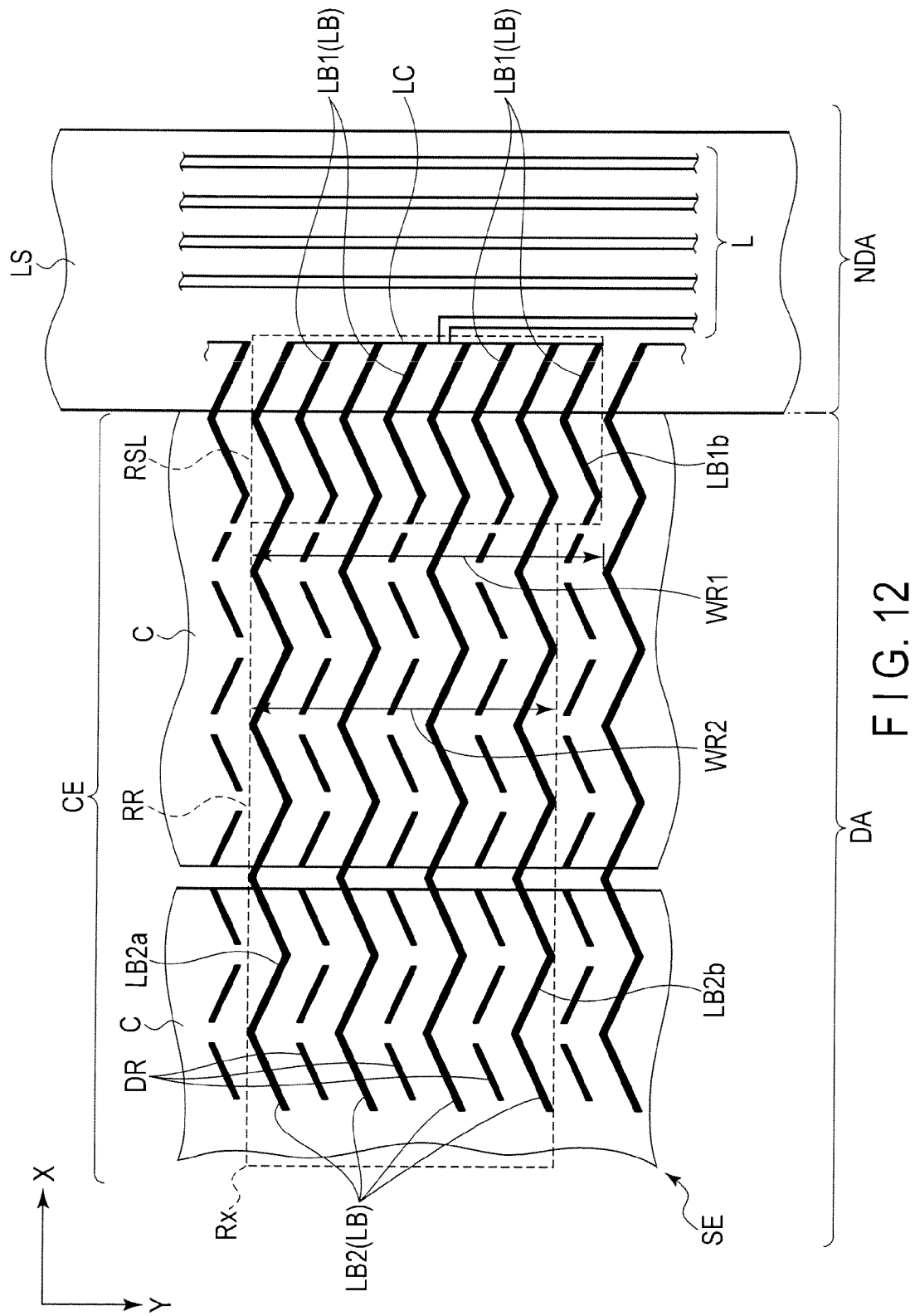
FIG. 12 is another plan view which schematically illustrates, in enlarged scale, a part of the sensor SE shown in FIG. 5.

FIG. 12 is another plan view which schematically illustrates, in enlarged scale, a part of the sensor SE shown in FIG. 5.

The example illustrated in FIG. 12 differs from the example illustrated in FIG. 6A in that, as regards the detection lines LB which form the detection electrode Rx, the first detection lines LB1 and second detection lines LB2 are alternately disposed in the second direction Y.

Specifically, the detection lines LB include first detection lines LB1 which are disposed only in the large-width portion RSL, and second detection lines LB2 which are longer than the first detection lines LB1 and extend over the large-width portion RSL and main body portion RR. In the example illustrated, four first detection lines LB1 and four second detection lines LB2 are alternately disposed, and each of these detection lines is connected to the connection line LC.

In the detection electrode Rx, the large-width portion RSL has a first width WR1 in the second direction Y, and the main body portion RR has a second width WR2 in the second direction Y. The second width WR2 is less than the first width WR1. In the example illustrated, the large-width portion RSL neighbors the main body portion RR in the first direction X, and is formed over such an area as to project toward one side in the second direction Y relative to the main body portion RR. If attention is paid to a part of the detection electrode Rx illustrated, the detection electrode Rx is formed substantially in an L shape.

In the example illustrated, the first width WR1 is a first distance in the second direction Y between a second detection line LB2a (an apex portion of an upwardly (in the Figure) convexed part of the second detection line LB2a), which is connected to one end side of the connection line LC, and a first detection line LB1b (an apex portion of a downwardly (in the Figure) convexed part of the first detection line LB1b), which is connected to the other end side of the connection line LC. The second width WR2 is a second distance in the second direction Y between a second detection line LB2a (an apex portion of an upwardly (in the Figure) convexed part of the second detection line LB2a), which is connected to one end side of the connection line LC, and a second detection line LB2b (an apex portion of a downwardly (in the Figure) convexed part of the second detection line LB2b) which is connected to the other end side of the connection line LC. The first distance is greater than the second distance.

A dummy electrode DR is disposed between neighboring second detection lines LB2 (or on an extension line of the first detection line LB1). In the display area DA, the second detection lines LB2 and dummy electrodes DR are alternately disposed.

In this modification, the same advantageous effects as in the above example can be obtained. In addition, compared to the example illustrated in FIG. 6A, since the second detection lines LB2 and dummy electrodes DR are alternately disposed in the display area DA, the distribution of pixels, which the second detection lines LB2 cross, can be made uniform, and the transmittance or appearance of the display area DA can be made uniform.

Figure 13:
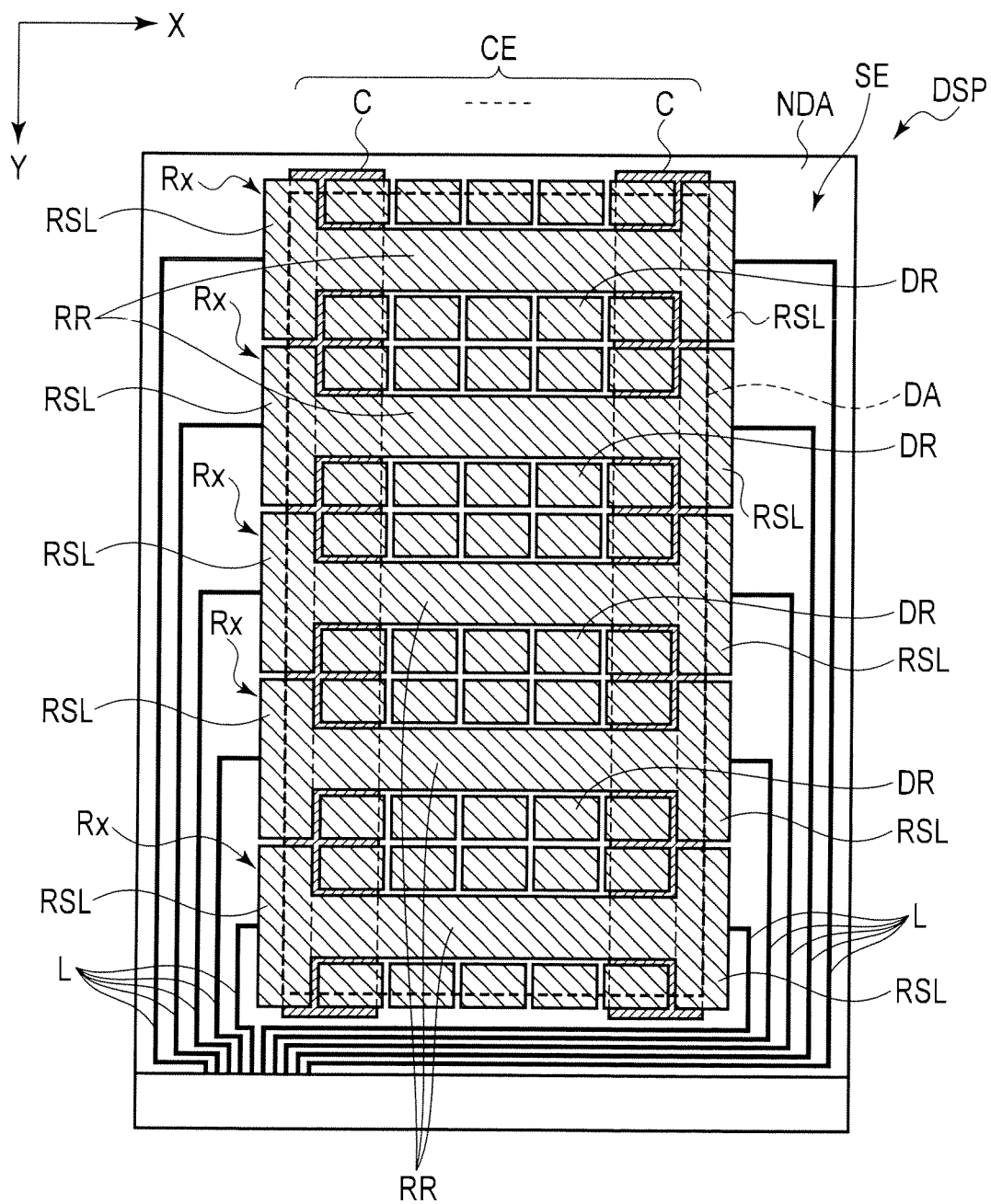
FIG. 13 is a plan view which schematically illustrates another structure of the sensor SE in the embodiment.

FIG. 13 is a plan view which schematically illustrates another structure of the sensor SE in the embodiment.

The example illustrated in FIG. 13 differs from the above-described example in that each of the detection electrodes Rx and dummy electrodes DR is formed of a transparent, electrically conductive material such as ITO or IZO.

Specifically, in the display area DA, the common electrode CE includes a plurality of divisional electrodes C which are arranged at intervals in the first direction X and extend substantially linearly in the second direction Y. In the display area DA, the detection electrodes Rx are arranged at intervals in the second direction Y and extend substantially linearly in the first direction X. The lead lines L are disposed in the non-display area NDA, and are electrically connected to the detection electrodes Rx. In the example illustrated, the lead lines L are disposed on both sides of the non-display area NDA, with the display area DA interposed, and lead lines L are connected to one detection electrode Rx on both sides of this detection electrode Rx. Incidentally, depiction of the common electrode driving circuit and flexible printed circuit boards is omitted here.

The detection electrode Rx includes a main body portion RR which is located in the display area DA, and large-width portions RSL which are connected to both ends of the main body portion RR. The main body portion RR is formed in a strip shape extending in the first direction X. The large-width portion RSL is connected to the lead line L, and is disposed to extend over a boundary between the display area DA and non-display area NDA. The large-width portion RSL is formed to have a greater width than the main body portion RR. In the example illustrated, each of the large-width portions RSL projects in both directions along the second direction Y, relative to the main body portion RR. Thus, the detection electrode Rx is formed substantially in an I shape.

Dummy electrodes DR each having an island shape are disposed between neighboring detection electrodes Rx. In the example illustrated, the dummy electrodes DR are disposed between neighboring main body portions RR, and are not disposed between neighboring large-width portions RSL.

In this modification, too, the same advantageous effects as in the above-described example can be obtained by the large-width portions RSL of the detection electrodes Rx. In addition, compared to the above-described example in which the detection electrodes Rx, which are composed of the detection lines LB formed of the metallic material, are applied, since the detection electrodes Rx are formed of the transparent, electrically conductive material, the loss of transmittance in the display area DA can be reduced.

FIG. 14 is a plan view which schematically illustrates another structure of the sensor SE in the embodiment.

The example illustrated in FIG. 14 differs from the example illustrated in FIG. 13 in that the divisional electrodes C of the common electrode CE extend in the first direction X, and the detection electrodes Rx extend substantially in the second direction Y. In the example illustrated, each of the detection electrodes Rx and dummy electrodes DR is formed of a transparent, electrically conductive material.

Specifically, in the display area DA, the common electrode CE includes a plurality of divisional electrodes C which are arranged at intervals in the second direction Y and extend substantially linearly in the first direction X. In the display area DA, the detection electrodes Rx are arranged at intervals in the first direction X and extend substantially linearly in the second direction Y. The common electrode CE and detection electrodes Rx are opposed to each other, with various dielectrics interposed, as described above. Each of the divisional electrodes C is electrically connected to the common electrode driving circuit (not shown). The lead lines L are disposed in the non-display area NDA, and are electrically connected to the detection electrodes Rx in a one-to-one correspondence. In the example illustrated, the lead lines L are disposed in a non-display area NDA along one end portion of the display area DA.

The detection electrode Rx includes a main body portion RR which is located in the display area DA, and a large-width portion RSL which is connected to one end of the main body portion RR. The main body portion RR is formed in a strip shape extending in the second direction Y. The large-width portion RSL is connected to the lead line L, and is disposed to extend over a boundary between the display area DA and non-display area NDA. The large-width portion RSL is formed to have a greater width than the main body portion RR. In the example illustrated, each of the large-width portions RSL projects in both directions along the first direction X, relative to the main body portion RR. Thus, the detection electrode Rx is formed substantially in a T shape.

Dummy electrodes DR each having an island shape are disposed between neighboring detection electrodes Rx. In the example illustrated, the dummy electrodes DR are disposed between neighboring main body portions RR, and are not disposed between neighboring large-width portions RSL.

In this modification, too, the same advantageous effects as in the example illustrated in FIG. 13 can be obtained by the large-width portions RSL of the detection electrodes Rx. In addition, compared to the example illustrated in FIG. 5, the length of the lead line L, which is connected to each detection electrode Rx, can be decreased, and noise of the lead line L can further be reduced.

Incidentally, the detection electrodes Rx and dummy electrodes DR may be formed of a metallic material. In this case, the detection electrodes Rx and dummy electrodes DR are formed of thin wires. In addition, the detection electrodes Rx and dummy electrodes DR may all be formed of a transparent, electrically conductive material, and may be stacked on thin wires which are formed of a metallic material in an upper layer or a lower layer of these detection electrodes Rx and dummy electrodes DR.

In the above-described embodiment, the description has been given of the sensor-equipped display device in which the common electrode CE incorporated in the display panel PNL functions as the sensor driving electrode, and which includes the detection electrodes opposed to the sensor driving electrode and the lead lines electrically connected to these detection electrodes. However, the embodiment is also applicable to a sensor device which is combined with, for example, by being attached to, a display panel which does not include sensor elements such as a sensor driving electrode and detection electrodes. To be more specific, the sensor device is configured to include a sensor panel including a sensor driving electrode, detection electrodes and lead lines, and a driving unit. The sensor driving electrode is provided at a position facing a display area of a display device. The detection electrodes are opposed to the sensor driving electrode. The lead lines are disposed at a position facing a non-display area which is outside the display area of the display device, are electrically connected to the detection electrodes, and output sensor output values from the detection electrodes. The driving unit supplies a sensor driving signal to the sensor driving electrode, causes the detection electrode to detect the sensor driving signal from the sensor driving electrode as a detection signal, and reads out a variation of this detection signal. In such a sensor device, the detection electrodes are connected to the lead lines, and are disposed along the boundary between the display area and non-display area, and each detection electrode includes a large-width portion having a first width, and a main body portion which extends in a direction away from the large-width portion, is disposed at a position opposed to the display area, and has a second width that is less than the first width. In this sensor device, too, the same advantageous effects as in the above-described embodiment can be obtained.

As has been described above, according to the present embodiment, a sensor-equipped display device and a sensor device, which can suppress a malfunction of a sensor, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor-equipped display device comprising:

a display panel including a common electrode and a pixel electrode which are disposed in a display area, and a first detection electrode and a second detection electrode which are opposed to the common electrode in the display area, wherein the first detection electrode is formed of a first connection line disposed in a non-display area outside the display area, and a plurality of first detection lines connected to the first connection line, a number of the first detection lines in a first large-width portion extending over a boundary between the display area and the non-display area being greater than a number of the first detection lines in a first main body portion located in the display area, the second detection electrode is formed of a second connection line disposed in the non-display area, and a plurality of second detection lines connected to the second connection line, a number of the second detection lines in a second large-width portion extending over the boundary and neighboring the first large-width portion being greater than a number of the second detection lines in a second main body portion located in the display area, the first detection lines and the second detection lines are arranged at regular intervals along the boundary, each of the first detection lines and the second detection lines is formed in a wavy shape with an equal wave height, and a distance between the first detection line of the first large-width portion, which neighbors the second large-width portion, and the second detection line of the second large-width portion, which neighbors the first large-width portion, is equal to or less than the wave height.

2. The sensor-equipped display device of claim 1, wherein the first large-width portion and the second large-width portion are arranged along a boundary between the display area and the non-display area and form a surrounding portion.

3. The sensor-equipped display device of claim 1, wherein the common electrode includes a plurality of divisional electrodes which are arranged at intervals in a first direction and extend in a second direction crossing the first direction, and each of the divisional electrodes has a first electrode width in the first direction, the first large-width portion has a second electrode width in the first direction in the display area, and the second electrode width is equal to or less than half the first electrode width.

4. The sensor-equipped display device of claim 1, wherein the first large-width portion and the first main body portion are arranged in a first direction, the first large-width portion has a second electrode width in the first direction in the display area, the first large-width portion has a third width in a second direction crossing the first direction at a portion thereof projecting from the first main body portion in the second direction, and the second electrode width is less than the third width.

5. The sensor-equipped display device of claim 1, wherein the first connection line, the first detection line and the second detection line are formed of a metallic material.

* * * * *